(12) United States Patent
Kneckt et al.

(10) Patent No.: US 12,439,241 B2
(45) Date of Patent: Oct. 7, 2025

(54) ADDRESS RANDOMIZATION SCHEMES FOR MULTI-LINK DEVICES

(71) Applicant: Apple Inc., Cupertino, CA (US)

(72) Inventors: Jarkko L. Kneckt, Los Gatos, CA (US); Aniruddha S. Diwan, San Jose, CA (US); Charles F. Dominguez, San Carlos, CA (US); Debashis Dash, San Jose, CA (US); Elliot S. Briggs, Carmel, CA (US); Matthew L. Semersky, San Jose, CA (US); Noam Ginsburg, Haifa (IL); Sidharth R. Thakur, San Jose, CA (US); Veerendra Boodannavar, Cupertino, CA (US); Welly Kasten, San Jose, CA (US); Nathan A. Kralian, Danvers, MA (US); Daniel R. Borges, San Francisco, CA (US); Oren Shani, Saratoga, CA (US); Su Khiong Yong, Palo Alto, CA (US); Yang Yu, Redwood City, CA (US); Yoel Boger, Shoham (IL); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 418 days.

(21) Appl. No.: 17/896,737

(22) Filed: Aug. 26, 2022

(65) Prior Publication Data

US 2023/0085657 A1    Mar. 23, 2023

Related U.S. Application Data

(60) Provisional application No. 63/243,688, filed on Sep. 13, 2021.

(51) Int. Cl.
*H04W 8/26* (2009.01)
*H04W 12/037* (2021.01)

(52) U.S. Cl.
CPC .......... *H04W 8/26* (2013.01); *H04W 12/037* (2021.01)

(58) Field of Classification Search
None
See application file for complete search history.

(56) References Cited

U.S. PATENT DOCUMENTS

2004/0006642 A1    1/2004   Jang et al.
2016/0135053 A1    5/2016   Lee et al.
(Continued)

FOREIGN PATENT DOCUMENTS

WO    WO 2021141529 A1    7/2021
WO    WO 2022253050 A1    12/2022

OTHER PUBLICATIONS

Extended European Search Report directed to related European Application No. 22195099.1, dated Feb. 6, 2023; 11 pages.

*Primary Examiner* — Benjamin Lamont
(74) *Attorney, Agent, or Firm* — Sterne, Kessler, Goldstein &Fox P.L.L.C.

(57) ABSTRACT

Embodiments are disclosed for address changing schemes for a multi-link device in a wireless communications system. Some embodiments include a privacy enhanced (PE) access point (AP) multi-link device (MLD) that includes one or more affiliated APs operating on different links. The PE AP MLD can generate a first randomized OTA MLD address based at least on the MLD address of the PE AP MLD for a first affiliated PE AP (PE AP1). The PE AP MLD can transmit a first data transmission using the first OTA MLD address where the first data transmission includes an encrypted aggregated MAC service data unit (A-MSDU) subframe that includes the MLD address. The PE AP MLD can correlate the MLD address of the PE AP MPL with multiple addresses comprising: the first OTA MLD, a unique (Continued)

MLD address, and a Media Access Control (MAC) service access point (SAP) MLD address.

20 Claims, 23 Drawing Sheets

(56) References Cited

U.S. PATENT DOCUMENTS

| | | | |
|---|---|---|---|
| 2018/0324142 A1 | 11/2018 | Adrangi et al. | |
| 2020/0351648 A1 | 11/2020 | Fang | |
| 2021/0050999 A1 | 2/2021 | Huang et al. | |
| 2021/0120602 A1 | 4/2021 | Huang et al. | |
| 2022/0386109 A1* | 12/2022 | Mccann | H04L 61/5038 |
| 2023/0049552 A1* | 2/2023 | Chitrakar | H04W 76/18 |
| 2023/0058871 A1* | 2/2023 | Xin | H04W 72/56 |
| 2023/0319550 A1* | 10/2023 | Patwardhan | H04W 12/03 |
| | | | 380/270 |

\* cited by examiner

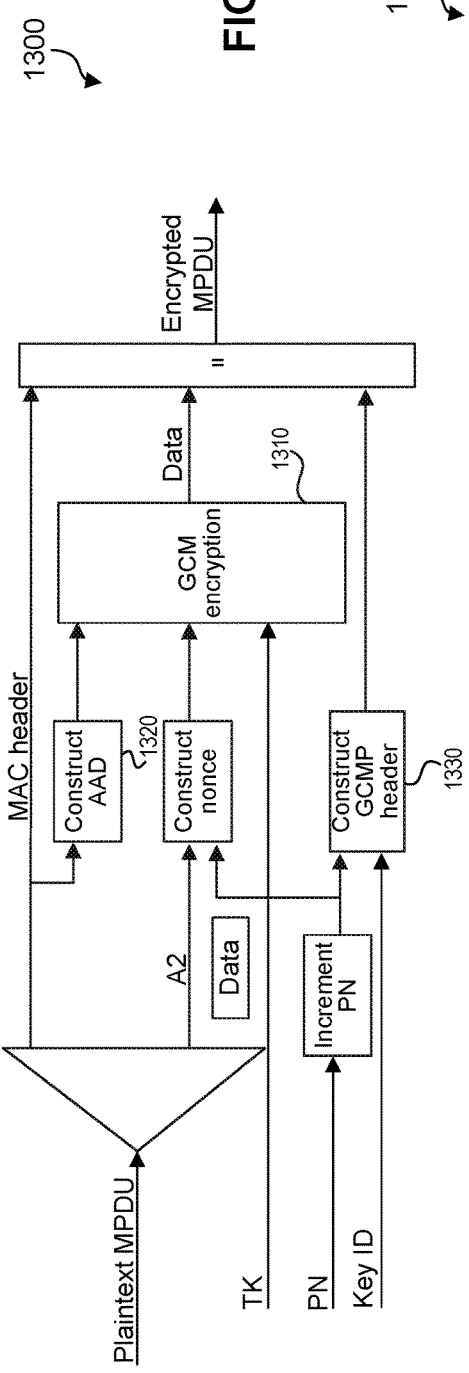
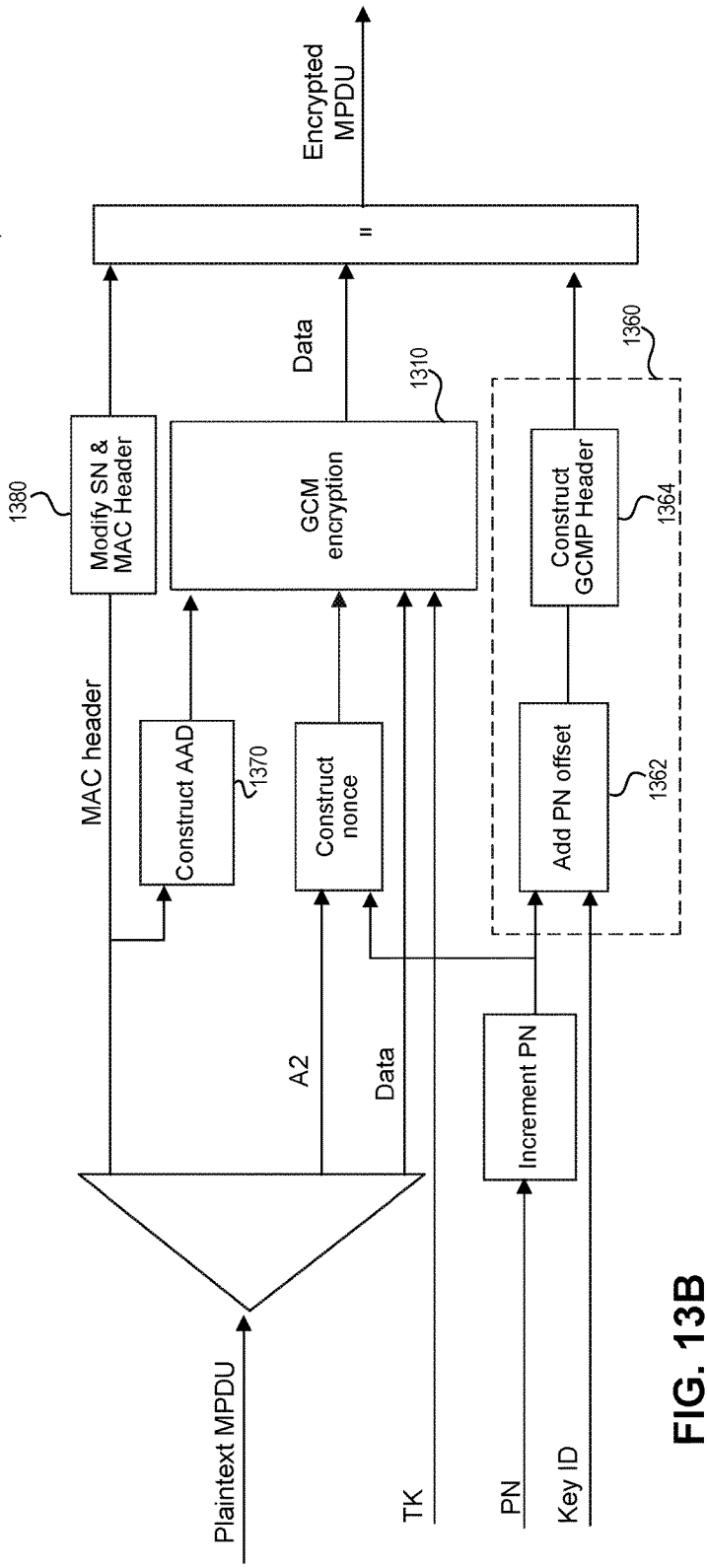
FIG. 13A
FIG. 13B

ADDRESS RANDOMIZATION SCHEMES FOR MULTI-LINK DEVICES

CROSS-REFERENCE TO RELATED APPLICATIONS

This application claims benefit of U.S. Provisional Application No. 63/243,688, filed on Sep. 13, 2021, entitled, Address Randomization Schemes for Multi-link Devices, which is incorporated herein by reference in its entirety.

BACKGROUND

Field

The embodiments relate generally to improving privacy among wireless devices communicating in a wireless communication system.

SUMMARY

Some embodiments include an apparatus, method, and computer program product for address randomization schemes for multi-link devices in a wireless communications system such as a Wireless LAN (WLAN) system. A privacy enhanced (PE) access point (AP) multi-link device (MLD) and a PE non-AP MLD can implement address randomization schemes that prevent MLD addresses and MLD-level parameters from being visible during communications so that a bad actor cannot readily trace or detect device addresses much less correlate device addresses to a MLD.

In some embodiments, a PE AP MLD that includes one or more affiliated APs operating on different links can generate the first OTA MLD address based at least on the MLD address, for a first affiliated PE AP (PE AP1) of the one or more affiliated APs, where the first OTA MLD address is different than a second OTA MLD address for a second affiliated PE AP (PE AP2). The PE AP MLD can transmit a first data transmission using the first OTA MLD address where the first data transmission comprises an encrypted aggregated MAC service data unit (A-MSDU) subframe that includes the MLD address. The PE AP MLD can generate a first parameter based at least on an MLD-level parameter of the PE AP MLD, for the PE AP1, where the first parameter is different than a second parameter of the PE AP2, and where the second parameter is based at least on the MLD-level parameter of the PE AP MLD.

In some embodiments, the PE AP MLD can establish two or more link-1 specific address profiles corresponding to the PE AP1 and a first PE non-AP station (PE non-AP STA1) of a PE non-AP MLD, where the two or more link-1 specific address profiles are different than other link-specific address profiles corresponding to the PE AP2. The PE AP MLD can establish a schedule for switching from a first link-1 specific address profile to a second link-1 specific address profile, where the first and the second link-1 specific address profiles are of the two or more link-1 specific address profiles. The PE AP MLD can transmit a second data transmission using the first parameter, where the first parameter corresponds to the first link-1 specific address profile. The schedule for switching from the first link-1 specific address profile to the second link-1 specific address profile can be based on a link-1 specific time synchronization function (TSF) parameter where link 1 operates independently according to a link-1 specific TSF timer. The PE AP MLD can switch from the first link-1 specific address profile to the second link-1 specific address profile based on the schedule, and transmit a third data transmission using the second link-1 specific address profile.

In some embodiments, the PE AP MLD can encrypt an A-MSDU for transmission to the PE non-AP STA1, and after the encryption, create an OTA packet number ($PN_{OTA}$) that is different than a packet number (PN) corresponding to the A-MSDU, where the second data transmission includes the $PN_{OTA}$, where the first link-1 specific address profile comprises an offset PN ($PN_{Offset}$) based at least on an MLD-level PN parameter, and where the $PN_{OTA}=PN+PN_{Offset}$. The PE AP MLD can, after the encryption, create an OTA sequence number ($SN_{OTA}$) that is different than a sequence number (SN) corresponding to the A-MSDU, where the second data transmission includes the $SN_{OTA}$, where the first link-1 specific address profile comprises an offset SN ($SN_{Offset}$) based at least on an MLD-level SN parameter, and where the $SN_{OTA}=SN+SN_{Offset}$. Further, after the encryption, the PE AP MLD can apply a first PE AP1 identifier of the first link-1 specific address profile, where the second data transmission includes the first PE AP1 identifier.

To establish the two or more link-1 specific address profiles, the PE AP MLD can establish a joint algorithm with the PE non-AP STA1, and use the joint algorithm determine the first and the second link-1 specific address profiles as well as transition times for the schedule. To establish the joint algorithm, the PE AP MLD can receive a link-1 specific individual address set algorithm, a MAC address seed, and a proposed address set average duration. In response to the reception, the PE AP MLD can transmit a link-1 specific individual address set start time seed, a link-1 specific individual address set end time seed, a link-1 specific group address algorithm, and a PE AP1 MAC address seed.

In some embodiments, the PE AP MLD can receive from the PE non-AP STA1, a notification of a colliding MAC address, where the notification includes: the colliding MAC address, a proposed new MAC address for the PE non-AP STA1, a time when the proposed new MAC address for the PE non-AP STA1 is in use, or a proposed new MAC address for the PE AP1. The PE AP MLD can subsequently transmit to the PE non-AP STA1, a confirmation message corresponding to the notification. In some examples, the first link-1 specific address profile includes one or more randomized parameters including but not limited to an association ID (AID) or a color value.

In some embodiments, a PE non-AP MLD including one or more affiliated STAs operating on different links can correlate an MLD address of the PE non-AP MLD with multiple addresses including: a first over-the-air (OTA) MLD address, a unique MLD address, and a Media Access Control (MAC) service access point (SAP) MLD address. The PE non-AP MLD can generate the first OTA MLD address based at least on the MLD address, for a first affiliated PE non-AP STA (PE non-AP STA1) of the one or more affiliated STAs, where the first OTA MLD address is different than a second OTA MLD address for a second affiliated PE non-AP (PE non-AP STA2) of the one or more affiliated STAs. The PE non-AP MLD can transmit a first data transmission using the first OTA MLD address where the first data transmission includes an encrypted aggregated MAC service data unit (A-MSDU) subframe that includes the MLD address.

The PE non-AP MLD can generate a first parameter based at least on an MLD-level parameter of the PE non-AP MLD, for the PE non-AP STA1, wherein the first parameter is different than a second parameter of the PE non-AP STA2, wherein the second parameter is based at least on the MLD-level parameter of the PE non-AP MLD.

In some embodiments, the PE non-AP MLD can establish two or more link-1 specific address profiles corresponding to the PE non-AP STA1 and a first PE AP (PE AP1) of a PE AP MLD, where the two or more link-1 specific address profiles are different than other link-specific address profiles corresponding to the PE non-AP STA2. The PE non-AP MLD can establish a schedule for switching from a first link-1 specific address profile to a second link-1 specific address profile, and transmit a second data transmission using the first parameter, where the first parameter corresponds to the first link-1 specific address profile. The schedule for switching from the first link-1 specific address profile to the second link-1 specific address profile can be based on the first parameter, where the MLD-level parameter of the PE non-AP MLD includes an MLD-level time synchronization function (TSF) parameter. The PE non-AP MLD can switch from the first link-1 specific address profile to the second link-1 specific address profile based on the schedule, and transmit a third data transmission using the second link-1 specific address profile.

In some embodiments, the PE non-AP MLD can encrypt an A-MSDU for transmission to the PE AP1, and after the encryption, create an OTA packet number ($PN_{OTA}$) that is different than a packet number (PN) corresponding to the A-MSDU, where the second data transmission includes the $PN_{OTA}$, where the first link-1 specific address profile includes an offset PN ($PN_{Offset}$) based at least on an MLD-level PN parameter, and where the $PN_{OTA}=PN+PN_{Offset}$. The PE non-AP MLD can, after the encryption, create an OTA sequence number ($SN_{OTA}$) that is different than a sequence number (SN) corresponding to the A-MSDU, wherein the second data transmission comprises the $SN_{OTA}$, where the first link-1 specific address profile comprises an offset SN ($SN_{Offset}$) based at least on an MLD-level SN parameter, and where the $SN_{OTA}=SN+SN_{Offset}$. The PE non-AP MLD can also, after the encryption, apply a first PE non-AP STA1 identifier of the first link-1 specific address profile, where the second data transmission comprises the first PE non-AP STA1 identifier.

In some embodiments, a PE AP MLD can correlate an MLD address of the PE AP MLD with multiple addresses including: a first over-the-air (OTA) MLD address, a unique MLD address, and a Media Access Control (MAC) service access point (SAP) MLD address. In some embodiments, the OTA MLD address is same as a MAC SAP MLD address.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 13A illustrates a diagram showing data that is delivered to Galois/counter mode (GCM) encryption.

FIG. 13B illustrates an example of an encryption block diagram supporting randomized address sets, according to some embodiments of the disclosure.

Figure 1:
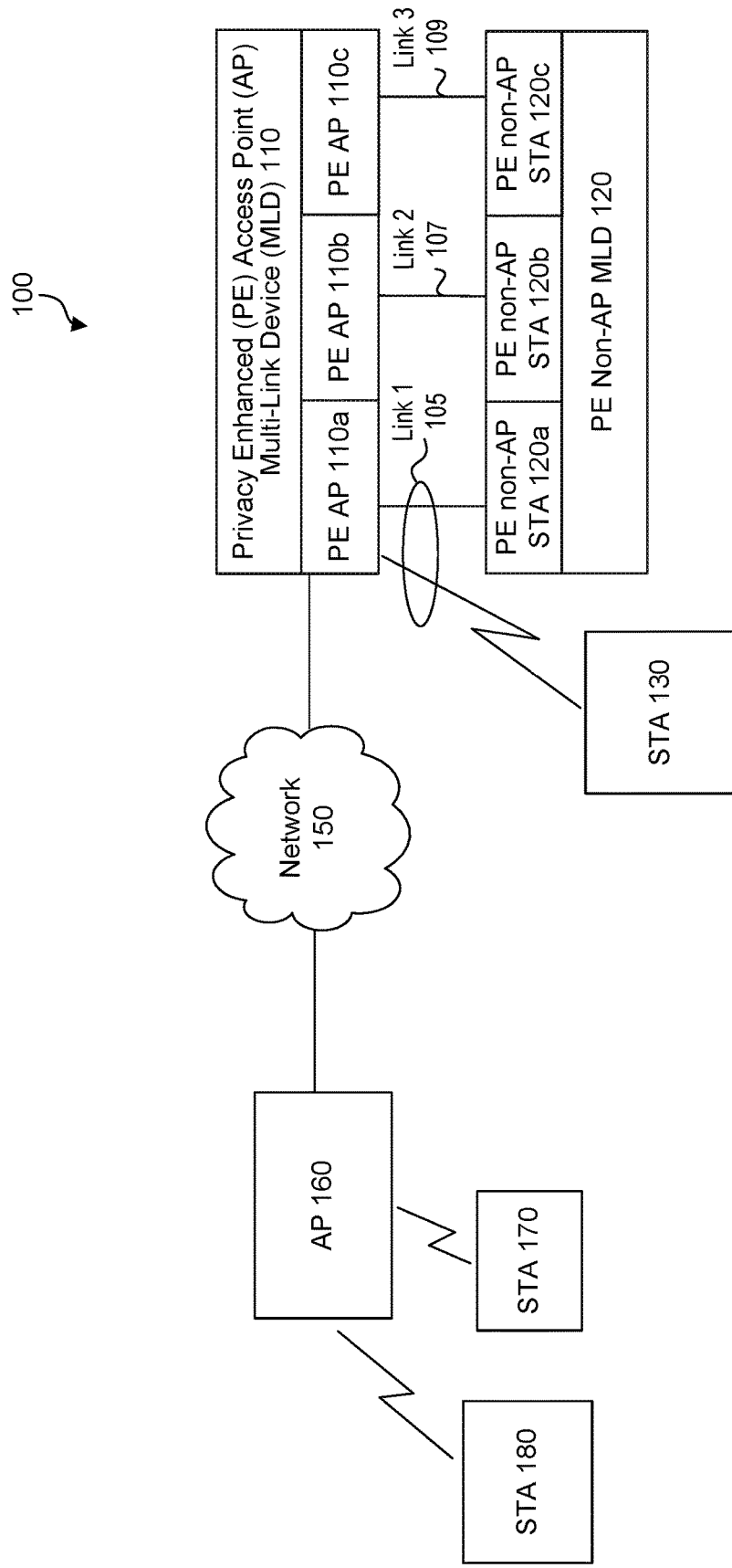
FIG. 1 illustrates an example system for address randomization schemes, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments include address randomization schemes for devices including multi-link devices (MLDs) in a wireless communications system that prevent a bad actor from tracing, tracking, and/or detecting Media Access Control (MAC) addresses of access points (APs), stations (STAs), privacy enhanced (PE) AP MLDs, and PE non-AP MLDs. Since the MAC addresses are not readily traceable and/or trackable, security of the wireless communications among the devices is improved.

Figure 3A:
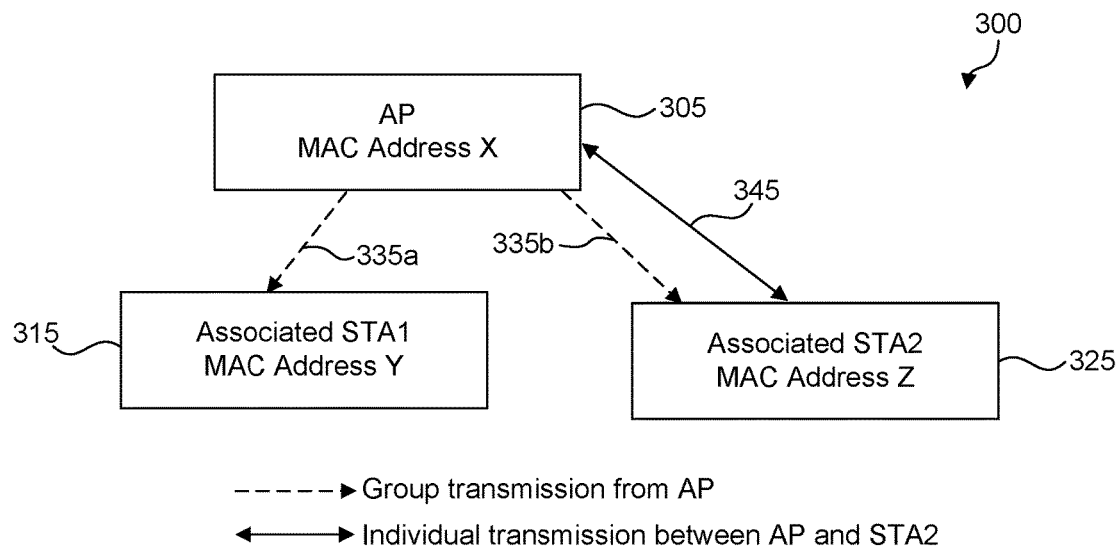
FIG. 3A illustrates an example of a hidden access point (AP) system.

FIG. 3A illustrates example 300 of a hidden AP system that can include APs in vehicles or mobile APs. Example 300 includes hidden AP 305, STA1 315 and STA2 325. When hidden AP 305 begins to operate, AP 305 can randomize parameters that are static for the short duration of operation. For example, AP 305 can transmit a group transmission 335a and 335b to STA1 315 and STA2 325 or an individual transmission 345 to STA2 325. For the short duration of operation, MAC addresses X, Y, and Z are used until the short duration of operation ends. When AP 305 begins to operate again, different randomized parameters are used and different values of MAC addresses X, Y, and Z are used that remain static for the short duration of operation. By using randomized parameters for a short duration of operation, the devices using the changed MAC addresses can be difficult to determine.

Figure 3B:
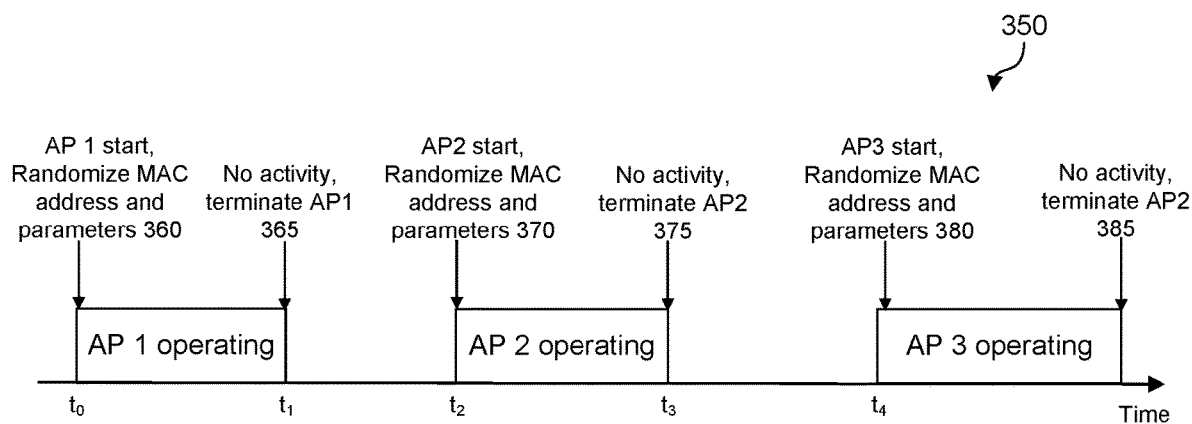
FIG. 3B illustrates an example of a hidden AP operation.

FIG. 3B illustrates example 350 of a hidden AP operation. Example 350 includes 3 short duration operations. At the start of the first operation 360, AP1 can randomize MAC addresses and parameters that are used for the duration of operation that ends at 365. At the start of the second operation 370, AP2, essentially a different AP, randomizes MAC addresses and parameters and begins operating until the duration ends at 375. At the start of the third operation 380, AP3, yet a different AP, randomizes MAC addresses and parameters and begins operating until the duration ends at 385. While the randomized addresses and parameters provide a measure of security, the hidden AP approach is not practical in the operation of wireless communication systems that have a longer duration of operation, including but not limited to Wi-Fi as described in IEEE P802.11REVme_D0.0, Draft Standard for Information technology—Telecommunications and information exchange between systems Local and metropolitan area networks—Specific requirements, Part 11: Wireless LAN Medium Access Control (MAC) and Physical Layer (PHY) Specifications "IEEE P802.11REVme".

FIG. 1 illustrates example system 100 for address randomization schemes, in accordance with some embodiments of the disclosure. System 100 includes privacy enhanced (PE) AP multi-link device (MLD) 110 that provides PE non-AP MLD 120 and STA 130 with access to network 150. System 100 also includes AP 160 (e.g., a single link device) that provides STA 180 and STA 170 (e.g., a single link device) with access to network 150. PE AP MLD 110 can include affiliated PE APs (e.g., PE AP 110a-110c) and PE non-AP MLD 120 can include affiliated PE non-AP STAs (e.g., PE non-AP STAs 120a-120c) that communicate via multiple links: link 1 105, link 2 107, and link 3 109. PE non-AP MLD 120, STA 130, STA 180, and STA 170 can be electronic devices that may include but are not limited to a cellular phone, a smart phone, a tablet, a personal digital assistant (PDA), or a laptop. Network 150 may include but is not limited to, any of or any combination of local area networks (LANs), metropolitan area networks (MANs), wireless local area networks (WLANs), and/or the Internet. Non-AP MLD 120 and STA 130 in proximity to AP MLD 110 may associate with AP MLD 110. STA 180 and STA 170 in proximity to AP 160 may associate with AP 160.

In some embodiments, AP 160 can establish multiple address profiles with STA 180 and multiple different address profiles with STA 170, establish a schedule for switching from one address profile to another, and transmit data using the address profiles that are currently in use. In some embodiments, MLD devices can include two types of address randomization schemes: one at the MLD address level and another at link-specific address level. PE AP MLD 110 and PE non-AP MLD 120 can randomize MLD addresses and MLD level parameters so that MLD addresses and MLD level parameters are not transmitted unencrypted over the air. The randomized MLD addresses and MLD level parameters can be different for each link (e.g., link 1 105, link 2 107, and link 3 109) used by PE AP MLD 110 and PE non-AP MLD 120. In addition, an affiliated PE AP (e.g., PE AP 110a) of PE AP MLD 110 can establish multiple address profiles that are link-specific with STA 130 and multiple address profiles with an affiliated PE non-AP STA (e.g., PE non-AP STA 120a) of PE non-AP MLD 120, establish a schedule for switching from one address profile to another, and transmit data using the address profiles that are currently in use.

Figure 2:
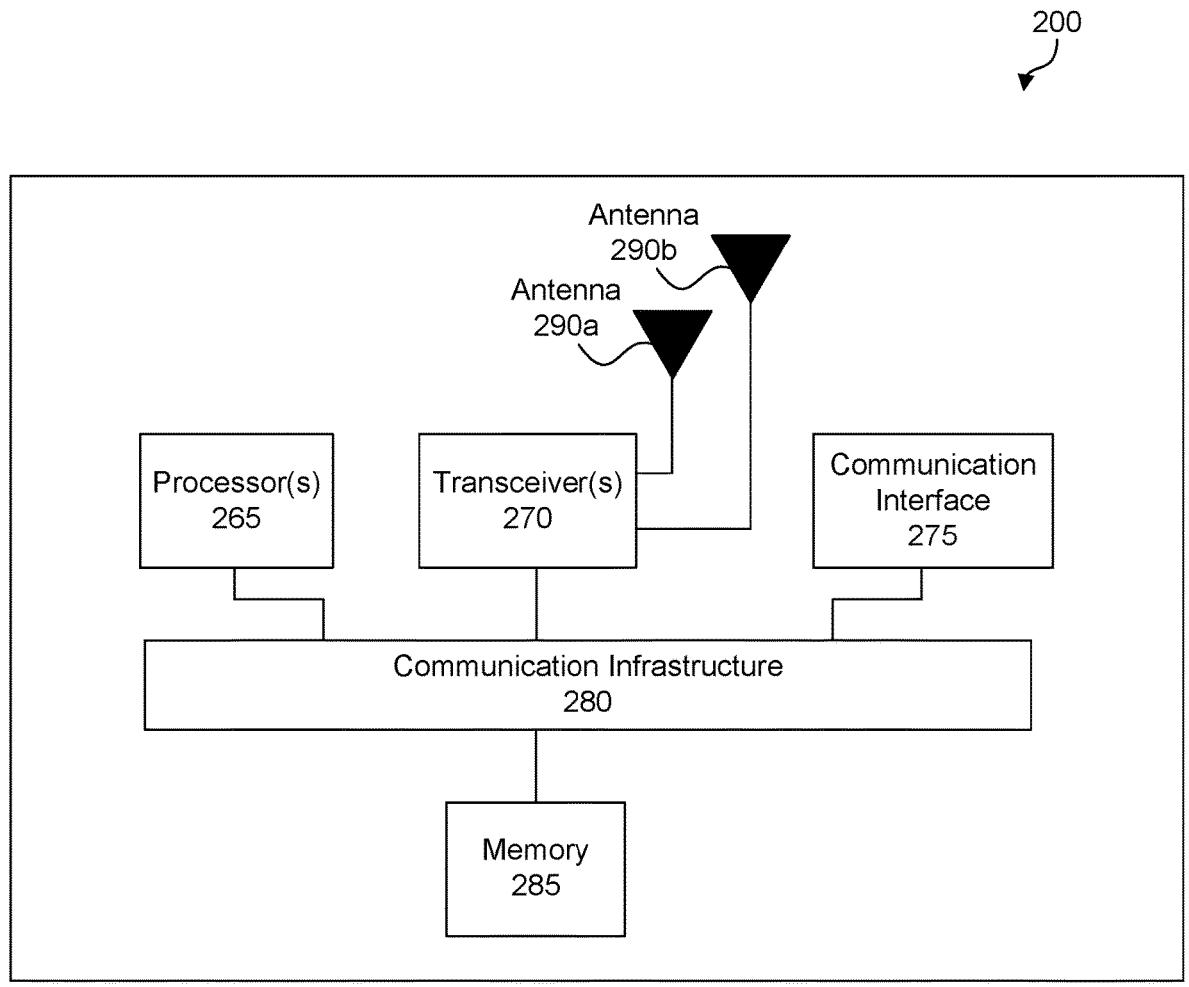
FIG. 2 illustrates a block diagram of an example wireless system supporting address randomization schemes, according to some embodiments of the disclosure.

FIG. 2 illustrates a block diagram of an example wireless system supporting address randomization schemes, according to some embodiments of the disclosure. For explanation purposes and not a limitation, FIG. 2 may be described with reference to elements from FIG. 1. For example, system 200 may be any of the electronic devices (e.g., AP 160, PE AP MLD 110, PE AP 110a-110c, PE non-AP MLD 120, PE non-AP STAs 120-120c, STAs 130, STA 180, and STA 170) of system 100. System 200 includes one or more processors 265, transceiver(s) 270, communication interface 275, communication infrastructure 280, memory 285, and antenna 290. Memory 285 may include random access memory (RAM) and/or cache, and may include control logic (e.g., computer instructions) and/or data. One or more processors 265 can execute the instructions stored in memory 285 to perform operations enabling wireless system 200 to transmit and receive wireless communications, including the functions for performing address randomization schemes herein. In some embodiments, one or more processors 265 can be "hard coded" to perform the functions herein. Transceiver(s) 270 transmits and receives wireless communications signals including wireless communications supporting address randomization schemes according to some embodiments, and may be coupled to one or more antennas 290 (e.g., 290a, 290b). In some embodiments, a transceiver 270a (not shown) may be coupled to antenna 290a and different transceiver 270b (not shown) can be coupled to antenna 290b. Communication interface 275 allows system 200 to communicate with other devices that may be wired and/or wireless. Communication infrastructure 280 may be a bus. Antenna 290 may include one or more antennas that may be the same or different types.

To increase privacy and security of wireless communications and traceabilty of MAC addresses, some embodiments include individual (also referred to herein as unicast) address sets and group (also referred to herein as groupcast) address sets that include addresses and parameters that always change, but at different (e.g., random) times. Having the many changes avoids significant one-time changes that may be traceable. Individual address set data used in transmissions to/from an AP (e.g., AP 160) and an associated STA (e.g., STA 180 or STA 170) should be known only by the AP and the associated STA (e.g., between AP 160 and STA 180, and between AP 160 and STA 170). Individual address set changes and availability are scheduled only between the AP and the associated STA. Group address sets used by an AP (e.g., AP 160) should be known by all associated STAs (e.g., STA 180 and STA 170). An AP (e.g., AP 160) may schedule the group address set in use for all associated STAs (e.g., STA 180 and STA 170). Individual addresses in individual address sets and group addresses in group address sets in use are scheduled and can change based on randomized time synchronization function (TSF) parameter values (e.g., times.)

Looking at an MLD example, link-specific individual addresses used in transmissions on link 1 105 to/from a PE AP (e.g., PE AP 110a) and an associated STA (e.g., STA 130 or PE non-AP STA 120a) should be known only by the AP and the associated STA. Individual address changes and availability are scheduled only between the AP and the associated STA. In the MLD example, group addresses used by PE AP (e.g., PE AP 110a) should be known by all associated STAs (e.g., STA 130 and PE non-AP STA 120a). APE AP (e.g., PE AP 110a) may schedule the group address in use for all associated STAs (e.g., STA 130 and PE non-AP STA 120a). Individual addresses and group addresses in use are scheduled and can change based on randomized MLD-level time synchronization function (TSF) parameter values (e.g., times).

Figure 4A:
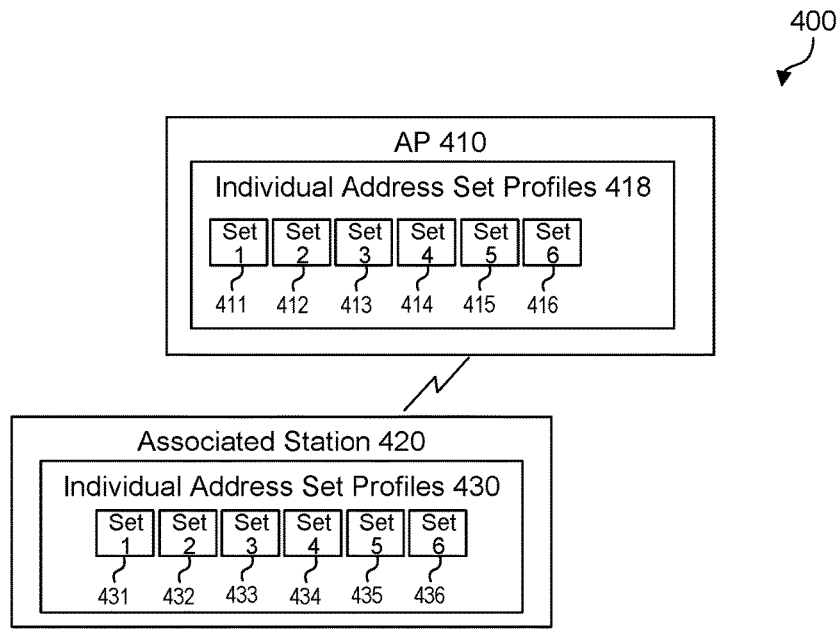
FIG. 4A illustrates an example of a system with randomized individual address sets, according to some embodiments of the disclosure.

FIG. 4A illustrates example system 400 with randomized individual address sets, according to some embodiments of the disclosure. For explanation purposes and not a limitation, FIG. 4A may be described with reference to elements from FIG. 1. For example, AP 410 can be AP 160 or one of PE AP 110a-110c, and associated STA 420 can be STA 130, STA 180, STA 170, or one of PE non-AP STA 120a-120c of FIG. 1.

AP 410 includes individual address set profiles 418. In system 400, 6 individual address set profiles (herein also known as individual address profiles) are shown: individual address profiles 411-416. Associated STA 420 includes individual address set profiles 430 that includes 6 individual address profiles 431-436 that correspond respectively to the individual address profiles 411-416 of AP 410.

An individual address set profile is shown below in Table 1. Individual Address Set.

TABLE 1

Individual Address Set

| Identifier Type | Addresses and Parameters |
| --- | --- |
| AP/BSS identifier | $BSSID_{unicast}$ |
|  | Color Field value |
| STA identifier | STA Link $Address_{unicast}$ |
|  | STA AID |
| Encryption parameters | PN $Offset_{unicast}$ |
| Reception parameters | SN Offset $(TID)_{unicast}$ |

An individual address set (e.g., one of 411-416) defines the addresses and identifiers for the individually addressed transmissions between AP 410 and associated STA 420. In some embodiments, the addresses and identifiers are only known by AP 410 and associated STA 420 to provide address privacy. In system 400, AP 410 and associated STA 420 established 6 individual address sets 411-416, for communications. In some embodiments (not shown), AP 410 can configure different individual address set profiles (e.g., 411-416) with different associated STAs (e.g., STA 420 may include individual address sets 411-414, while a different STA (not shown) may be configured with individual address sets 415-416).

Some embodiments include features and operations for address randomization as shown in Table 2. Rules for APs and STAs that use Address Randomization.

TABLE 2

Rules for APs and STAs that use Address Randomization

| Recommendations to Improve Privacy | Description |
| --- | --- |
| Use Protected management frames | (802.11w) Associated STAs only send encrypted management frames |
| Use only secure security mode | Wi-Fi Protected Access v3 Personal Mode (WPA3 Personal) |
| Do not use unsecure security modes, like: | open network, WEP, WPA, WPA2, TRIP cipher suites |
| Implement privacy client privacy mechanisms: | Wi-Fi Client Privacy (WPA3 Release 3, 802.11aq): Randomized MAC Addresses, DHCP Pool Exhaustion (reclaim IP addresses from deleted users, if they run out), DHCP Lease Timeout <2 hours |
| The network should use preassociaiton security | The Preassociation Security Negotiation (PASN) protocol should be used to protect non-associated STAs frames transmitted to AP |
| Use protected Block Acks | The Block Ack Request frames should be protected, so that no |

TABLE 2-continued

Rules for APs and STAs that use Address Randomization

| Recommendations to Improve Privacy | Description |
|---|---|
| | device can change the SN from which the receiver keeps reorder buffer |
| Use Beacon protection | The Beacon frames should contain integrity check sum, so that receivers can verify the integrity of the received Beacon frames |
| Use encrypted A-MSDU to protect SA and DA | The transmitted data frames are A-MSDU aggregated and both the A-MSDU and the data payload are encrypted |

The mechanisms described below in Table 3. Recommendations to Improve Privacy help to keep AP 410 and associated STA 420 more private and prevent ways to trace associated STA 420 and AP 410.

TABLE 3

Recommendations to Improve Privacy

| Recommendations to Improve Privacy | Description |
|---|---|
| The following operations are disallowed: | The changing MAC Addresses deny the use of the following features: MAC Address Filtering or Access Control, MAC Address Identification, MAC Address Memory (MAC addresses will change and can identify a STA only temporarily) |
| To protect privacy Randomize AP address | Each random MAC address has: The Locally Administered bit, which shall be set to "1", and The Unicast/Multicast bit, which shall be set to "0"-the other 46 bits are set to random values AP hides its SSID and it is not transmitted in Beacons, etc. (e.g., frames) AP randomized the initial values of Time Stamp field (TSF), Sequence numbers of the PPDUs, Dialog token values to identify management frames, scrambler seeds in PHY preambles, 802.11aq scanning privacy is implemented for AP and STA, AP should scan at random times so that other STAs cannot detect AP to be scanning The element values that AP sends should not contain identifiers that can be used to fingerprint the AP, i.e. the elements should not contain serial numbers of other information that is STA specific. The order of the proprietary elements and elements should be random unless the order is defined in the standard. The random order is applied in all frames, including authentication, GAS, association, etc |

In some embodiments, the AP/basic service set (BSS) identifier and corresponding $BSSID_{unicast}$ and color field value, are known by all associated STAs, but the remaining information in Table 1. Individual Address configured between associated STA 420 and AP 410 are known only by associated STA 420 and AP 410. When the APB SS identifier is known by all the associated STAs an associated STA can detect if an associated AP is transmitting or receiving data which may prevent collisions. STAs may use spatial reuse and have more simultaneous transmissions. This embodiment may be useful, when AP 410 has only few associated STAs or when AP 410 and STA 420 are located far apart.

In some embodiments, individual addresses used in transmissions to/from an AP 410 and associated STA 420 should be known only by AP 410 and associated STA 420. Individual address changes and availability are scheduled only between AP 410 and associated STA 420.

Figure 4B:
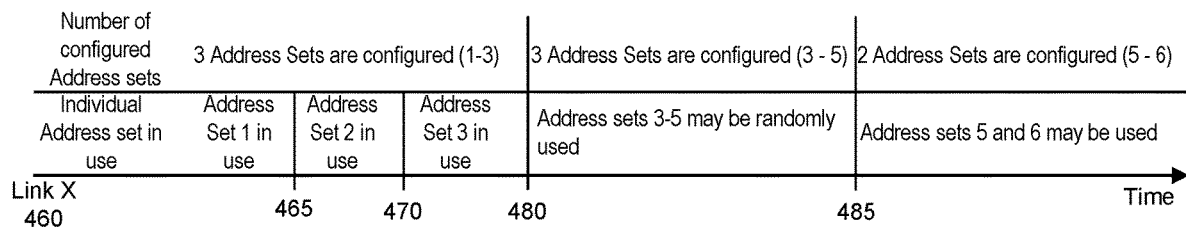
FIG. 4B illustrates an example of scheduling randomized individual address sets, according to some embodiments of the disclosure.

FIG. 4B illustrates example 450 of scheduling randomized individual address sets, according to some embodiments of the disclosure. For explanation purposes and not a limitation, FIG. 4B may be described with reference to elements from FIG. 4A. In example 450, AP 410 and associated STA 420 may configure and establish the individual address sets 411-416 (and corresponding individual address sets 431-436) to change at random times known only by AP 410 and STA 420. Example 450 illustrates the configuration and usage of the various individual address sets on on a timeline on link X, where link X can correspond in the MLD case to link 1 105, link 2 107, or link 3 109.

At 460, multiple address sets may be negotiated. For example, associated STA 420 and AP 410 configure and establish 3 address sets: individual address set 411 (431), 412 (432), and 413 (433) to be used between time 460 and time 480.

After the configuration and up to time 465, individual address set 411 (431) can be used to communicate between AP 410 and STA 420 (e.g., uplink and/or downlink communications).

Between time 465 and time 470, individual address set 412 (432) can be used to communicate between AP 410 and STA 420.

Between time 470 and time 480, individual address set 413 (433) can be used to communicate between AP 410 and STA 420.

At 480, new individual address sets (e.g., individual address sets 413 (433), 414 (434), and 415 (435) can be configured. In some embodiments, one or more individual address sets can be in use at a time. For example, between 480 and 485, associated STA 420 and AP 410 may randomly select one of individual address sets 413 (433), 414 (434), and 415 (435) for frame transmission. Having multiple individual address profiles available at the same time to AP 410 and associated STA 420 for communications is different than the hidden AP example 350 of FIG. 3B, where only one static individual address set is available for the short duration operation.

At 485, new individual address sets (e.g., individual address sets 415 (435) and 416 (436) can be configured. After 485, associated STA 420 and AP 410 may randomly select one of individual address sets 415 (435) and 416 (436) for frame transmission.

Figure 6:
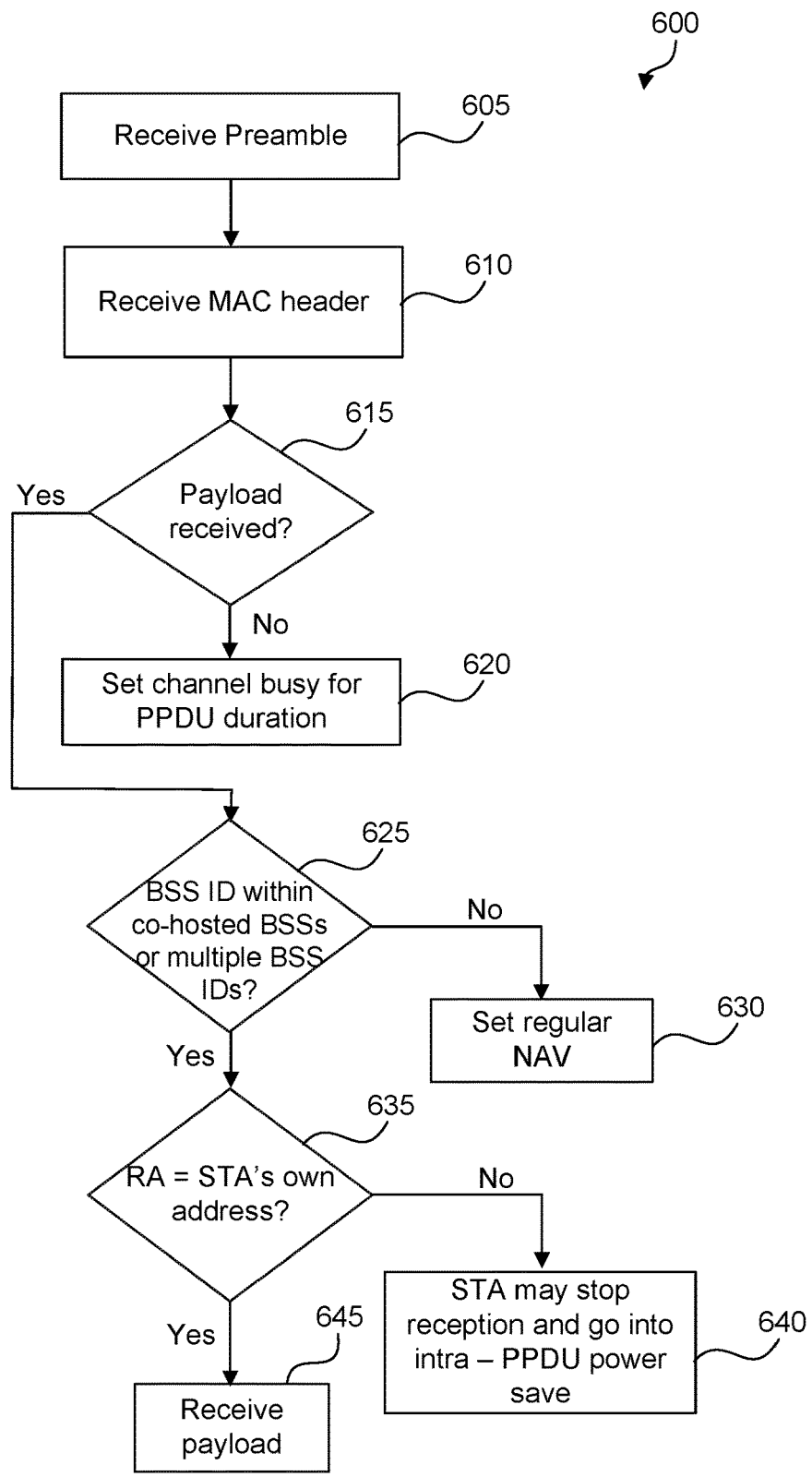
FIG. 6 illustrates an example method for receiving a physical layer protocol data unit (PPDU) that includes a randomized individual address set, according to some embodiments of the disclosure.

FIG. 6 illustrates example method 600 for receiving a physical layer protocol data unit (PPDU) that includes a randomized individual address set, according to some embodiments of the disclosure. For explanation purposes and not a limitation, FIG. 600 may be described with reference to elements from other figures in the disclosure. For example, method 600 can be performed by associated STA 420 of FIG. 4A in communication with AP 410 of FIG. 4A. In method 600, the individual address set profiles including the APB SS identifier, are known only by AP 410 and associated STA 420. In otherwords, associated STA 420 does not know the AP/BSS identifier (and corresponding addresses and parameters) in other individual address sets (e.g., Set 7 of another associated STA that is not shown.) In some embodiments, a color field value may be configured for an AP/BSS identifier, or a color field value may be set to a random value between 0-63. In some examples, AP 410 transmits a downlink frame to a STA (e.g., STAs 130, 170, 180) using one color value. In some examples, AP 410 may use legacy physical layer protocol data unit (PPDU) formats in transmissions to legacy STAs. As shown below in method 600, STA 420 receives at least one MAC header from a PPDU.

At 605, STA 420 receives a preamble and detects a PPDU duration.

At 610, STA 420 receives a MAC header and proceeds to 615, applying reception rules.

At 615, STA 420 determines whether a payload is received. If a payload is not received, method 600 proceeds to 620. Otherwise, method 600 proceeds to 625.

At 620, when a payload is not received, STA 420 can set the channel as being Busy for a duration of the PPDU.

At 625, STA 420 determines whether a BSSID is within co-hosted BSSs or multiple BSSIDs. When the BSSID is not within co-hosted BSSs or multiple BSSIDs (e.g., the BSSID detected does not match the BSSID corresponding to the individual address set being used), method 600 proceeds to 630. Otherwise, method 600 proceeds to 635.

At 630, STA 420 sets a regular network allocation vector (NAV) (e.g., the transmission was not intiated by STA 420.)

At 635, STA 420 determines whether the receiving address (RA) is equal to the MAC address of STA 420 (e.g., STA link Address$_{unicast}$ of the individual address set being used). When the RA is equal to the MAC address of STA 420, method 600 proceeds to 645. Otherwise, method 600 proceeds to 640.

At 645, STA 420 receives the payload of the PPDU detected.

Returning to 640, when the RA is not equal to the MAC address of STA 420, STA 420 may stop the reception and go into an intra-PPDU power save mode.

Figure 5A:
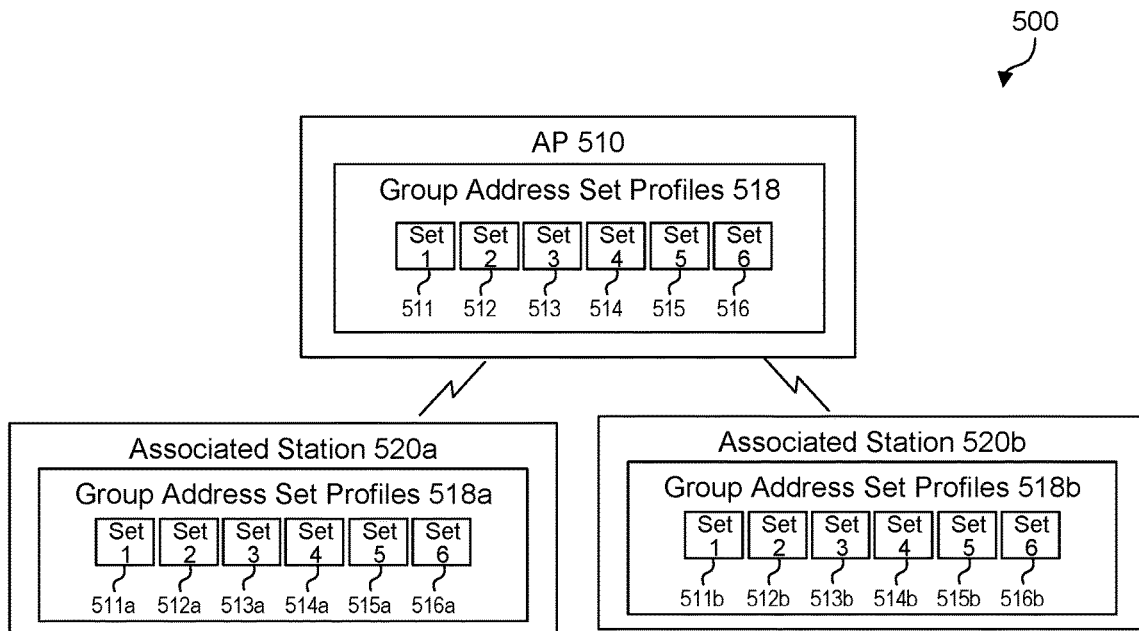
FIG. 5A illustrates an example of a system with randomized group address sets, according to some embodiments of the disclosure.

FIG. 5A illustrates an example system 500 with randomized group address sets, according to some embodiments of the disclosure. For explanation purposes and not a limitation, FIG. 5A may be described with reference to elements from FIG. 1. For example, AP 510 can be AP 160 or one of PE AP 110a-110c, and associated STAs 520a, 520b can be STA 130, STA 180, STA 170, or one of PE non-AP STA 120a-120c of FIG. 1.

AP 510 defines group address set parameters and the number of configured address sets 511-516. All group address sets are configured to all associated STAs 520a, 520b. AP 510 includes group address set profiles 518. In system 500, 6 group address sets (herein also known as group address profiles) are shown: group address profiles 511-516. Associated STAs 520a, 520b include group address set profiles 518a, 518b that includes corresponding group address profiles 511a-516a, 511b-516b that correspond respectively to the group address profile 511-516 of AP 510. In some embodiments group address set profiles 511-516 are substantially the same as group address profiles 511a-516a, 511b-516b.

A group address set profile is shown below in Table 4. Group Address Set.

TABLE 4

| Group Address Set | |
|---|---|
| Identifier Type | Addresses and Parameters |
| AP identification | BSSID$_{group}$ Group AID |
| Reception parameters | SN Offset group |
| Encryption parameters | PN Offset group |
| BSS parameters | TSF$_{Offset}$ Change Sequence Counters |

The group address set profile is used to transmit group data frames, group control frames, and group management frames to all associated STAs 520a, 520b. The group address sets are known by all associated STAs 520a, 520b. Associated STAs 520a, 520b can receive the group frames and associated STAs 520a, 520b know what BSS specific parameter values they may expect. The group address set configures coming BSS parameters changes including but not limited to TSF offset, Change Sequence Number, etc.

Figure 5B:
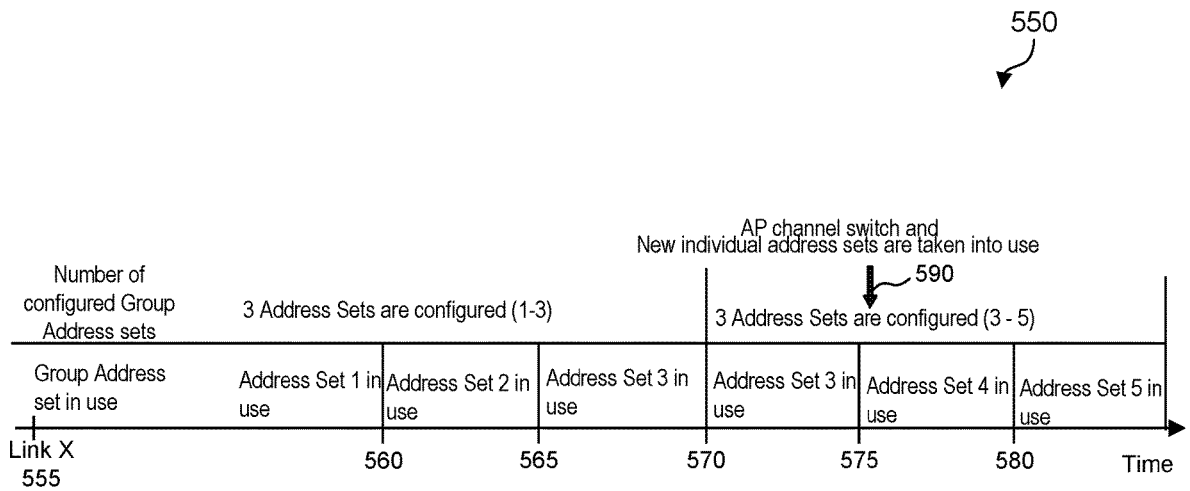
FIG. 5B illustrates an example of scheduling randomized group address sets including channel switching, according to some embodiments of the disclosure.

FIG. 5B illustrates example 550 of scheduling randomized group address sets including channel switching, according to some embodiments of the disclosure. For explanation purposes and not a limitation, FIG. 5B may be described with reference to elements from FIG. 5A. In example 550, AP 510 and associated STAs 520a, 520b may configure and establish the group address sets 511-516 (and corresponding individual address sets 531a-536a, 531b-536b) to change at random times. (Even though example 550 appears to be periodic, the time between changes e.g., between 565, 570, and 575, can vary.) Example 550 illustrates the configuration and usage of the various individual address sets on on a timeline on link X, where link X can correspond in the MLD case to link 1 105, link 2 107, or link 3 109. In example 550, one group address set is in use at a time.

At 555, multiple address sets may be negotiated. For example, AP 510, associated STA 520a, and associated STA 520b configure and establish 3 address sets: group address set 511 (511a, 511b), 512 (512a, 512b), and 513 (513a, 513b) to be used at different times between time 555 and time 570.

After the configuration and up to time 560, group address set 511 (511a, 511b), can be used to communicate from AP 510 to STAs 520a, 520b.

Between time 560 and time 565, group address set 512 (512*a*, 512*b*), can be used to communicate from AP 510 to STAs 520*a*, 520*b*.

Between time 565 and time 570, group address set 513 (513*a*, 513*b*), can be used to communicate from AP 510 to STAs 520*a*, 520*b*.

At 570, new group address sets are configured for operation during certain times. For example, group address sets 513 (513*a*, 513*b*) are in use between time 570 and time 575, group address sets 514 (514*a*, 514*b*) are in use between time 575 and time 580, and 515 (515*a*, 515*b*) are in use after time 580.

In some embodiments, AP 510 can also establish with STA 520, a time (e.g., 575) when the AP 510 begins operating on a different channel noted at 590. Thus, in addition to changing at time 575 to use group address sets 514 (514*a*, 514*b*), AP 510 begins operating on a different channel. Accordingly, STAs 520*a* and 520*b* tune to the different channel at substantially time 575 to receive group address communications according to group address sets 514 (514*a*, 514*b*) on the different channel. Further reception may remain on the different channel until AP 510 updates the schedule and/or the operating channel.

Figure 7:
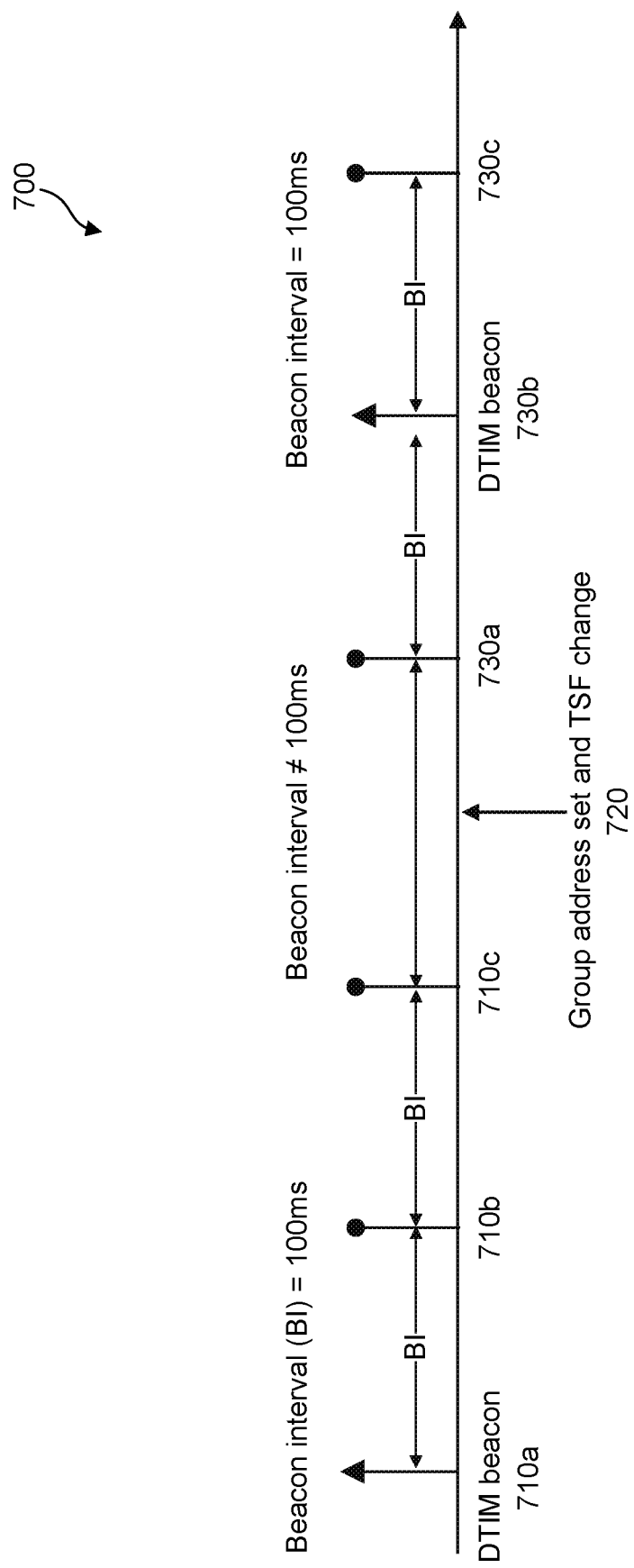
FIG. 7 illustrates an example of group address set randomizing timing synchronization function (TSF), according to some embodiments of the disclosure.

FIG. 7 illustrates example 700 of group address set randomizing timing synchronization function (TSF), according to some embodiments of the disclosure. For explanation purposes and not a limitation, FIG. 7 may be described with reference to elements from other figures in the disclosure. For example, example 700 can be performed by AP 520 of FIG. 5A.

In some embodiments, when TSF=0, AP 510 transmits a Delivery Traffic Indication Message (DTIM) beacon frame at 710*a*. After a DTIM beacon AP 510 sends buffered group addressed frames. AP 510 transmits a Traffic Indication Message (TIM) Beacon frame at 710*b* and 710*c*. Beacon frames can have a fixed transmission interval (e.g., 100 ms) and Target Beacon Transmission Time (TBTT) occurs on TSF times that are multiples of the Beacon interval. As described above, Table 4. Group Address Set can include BSS parameters that are randomized including a TSF offset. In other words, the group address set may change and the TSF time may change at 720. When the TSF time is changed, the Beacon frame transmission time can change correspondingly to 730*a*. In some embodiments, the Beacon frame is transmitted when TSF (Mod Beacon transmission interval)=0. Power saving STAs need to be aware of the AP group address sets and their individual address sets so that STAs may receive a Beacon frame.

In some examples, every X:th (X=4) beacon a DTIM beacon is transmitted. The DTIM interval may be changed in the group parameters randomization. After time the group address set and TSF change at 720, the following DTIM beacon occurs at 730*b* followed by TIM beacon 730*c*. In some embodiments, a new group address set may be signaled every Yth DTIM beacon (e.g., every $3^{rd}$ DTIM beacon). STAs may utilize unicast request/response signaling to fetch the group address sets. Buffered group data frames transmitted after a DTIM beacon should use the same group address set.

Figure 8:
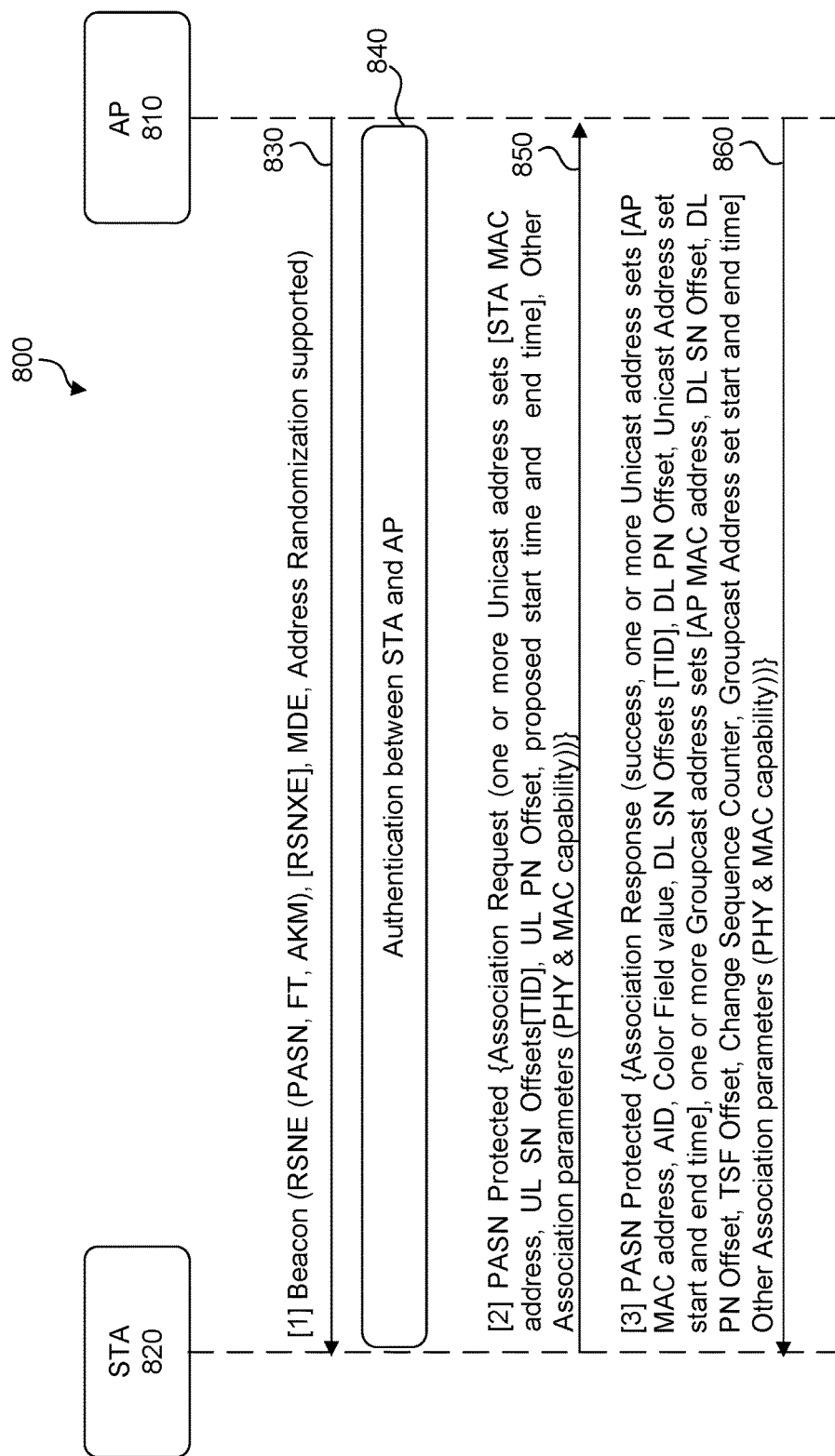
FIG. 8 illustrates an example of signaling for configuring randomized address sets, according to some embodiments of the disclosure.

FIG. 8 illustrates example 800 of signaling for configuring randomized address sets, according to some embodiments of the disclosure. For explanation purposes and not a limitation, FIG. 8 may be described with reference to elements other figures in the disclosure. For example, AP 810 can be AP 160 or one of PE AP 110*a*-110*c* of FIG. 1, and STA 820 can be STA 130, STA 180, STA 170, or one of PE non-AP STA 120*a*-120*c* of FIG. 1. Group address sets and individual address sets may operate in different schedules, and they may be configured into use during an association as shown in example 800. The association may configure the exact parameters of the individual and groupcast address sets. This mechanism may include update frames to update new individual and/or group address sets before the old ones expire. The association signals configure the unicast and groupcast address sets. The first unicast address set may be taken into use immediately after association.

At 830, AP 810 may transmit a Beacon frame that may signal support for address randomization and minimum number of individual address sets in association. The Beacon frame can include robust security network (RSN) element (RSNE) that includes an indication of: Preassociation Security Negotiation (PASN) protocol, fast basic service set (BSS) transition (FT), authentication and key management (AKM), Robust Security Network Extension element (RSNXE), Mobility Domain element (MDE), and/or Address Randomization supported.

At 840, authentication occurs between STA 820 and AP 810. The authentication may include PASN encryption setup, or the PASN encryption may be configured between STA 820 and AP 810 before the authentication. The authentication request includes the STA 820 association and authentication MAC address. The authentication response includes the AP 810 association and authentication MAC address.

At 850, STA 820 transmits a PASN protected Association Request that proposes one or more individual address sets and other association parameters. An individual address set can include: a STA MAC address, uplink (UL) sequence number (SN) offsets (e.g., separate SN offset for the traffic identifier (TID) specific SNs), UL packet number (PN) offset, proposed start time and end time of the individual address set. The other association parameters can include PHY and MAC capabilities of the STA.

The Association Request frame may also contain the MAC-SAP MAC address of STA 820 that STA 820 uses in frame encryption and the frame may include the MAC address STA 820 uses for authentication and association. Similarly, the Association Response may contain the MAC-SAP MAC address of AP 810 that AP 810 uses in frames encryption and the frame may include the MAC address AP 810 uses for authentication and association.

At 860, AP 810 can transmit a PASN protected Association Response that includes an indication of success (or not), one or more individual address sets, one or more group address sets, and other association parameters. For example, an individual address set can include: a corresponding AP MAC address (e.g., BSSID$_{unicast}$, association ID (AID) value, color field value, downlink (DL) SN offsets (e.g., SN offset for STA specific and TID specific SNs), DL individual PN offset, and a schedule for an individual address set.

AP 810 configures groupcast address sets, defines all parameters and schedules in association response. For example, the Association Response can include a group address set that includes: AP MAC address, DL SN offset, DL group PN Offset, TSF Offset, Change Sequence Counter value, and/or a group address set start and end time. After groupcast address set setup, the STA may receive group frames.

Figure 9:
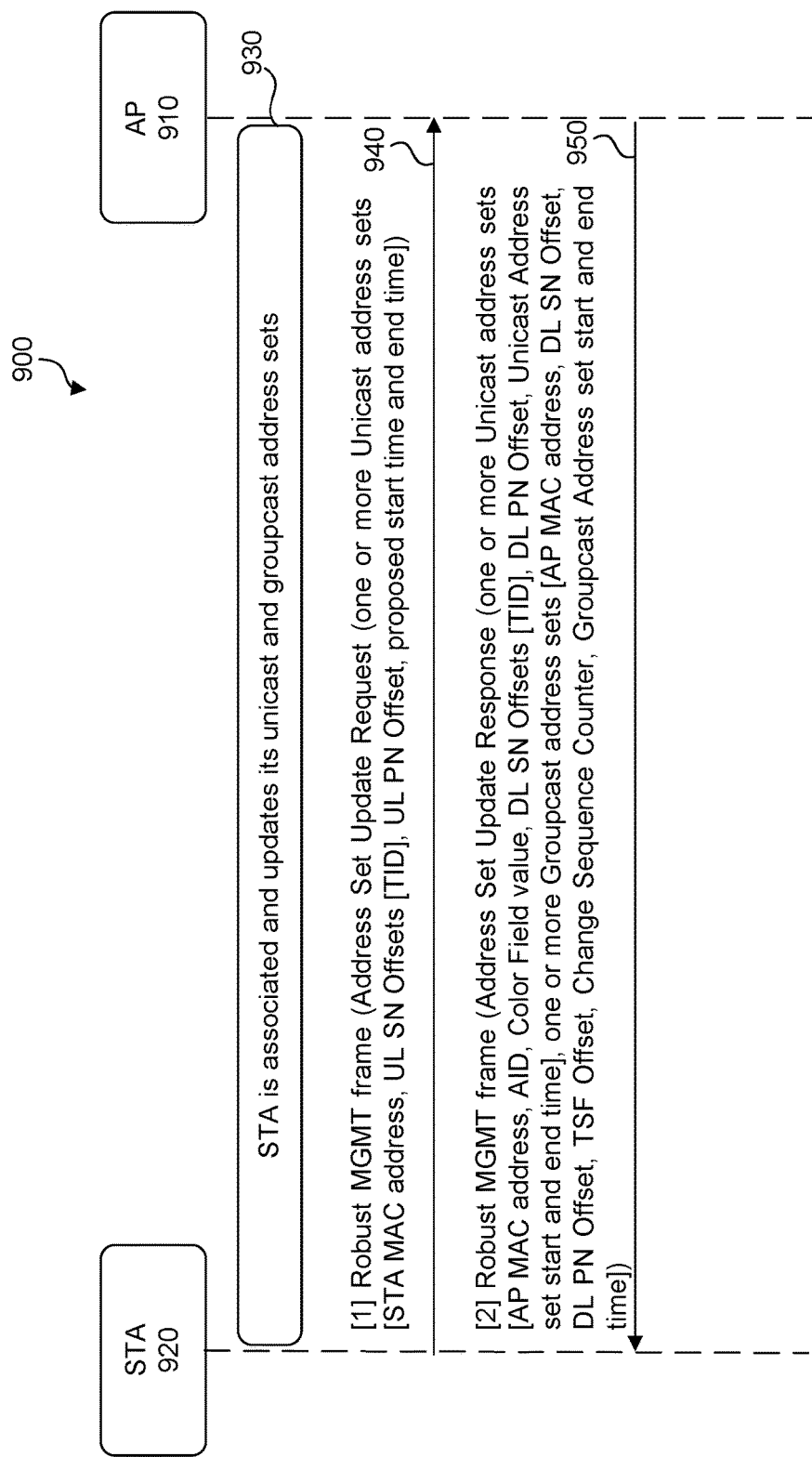
FIG. 9 illustrates an example of signaling for updating randomized address sets, according to some embodiments of the disclosure.

FIG. 9 illustrates example 900 of signaling for updating randomized address sets, according to some embodiments of the disclosure. For explanation purposes and not a limitation, FIG. 9 may be described with reference to elements other figures in the disclosure. For example, AP 910 can be AP 160 or one of PE AP 110a-110c of FIG. 1, and STA 920 can be STA 130, STA 180, STA 170, or one of PE non-AP STA 120a-120c of FIG. 1.

The individual and/or group address sets may be updated with new signaling messages. The same signaling may configure multiple individual (e.g., unicast) and group (e.g., groupcast) address sets. The address sets should be updated before the existing address sets expire. AP 910 or STA 920 may initiate an address set update. AP 910 may send an unsolicited Address Set Response frame to provide group address set parameters and AP 910 parameters for individual address sets.

In some embodiments, AP 910 and STA 920 may setup a recovery individual address set. The recovery address set is used only if all unicast address sets have expired (e.g., STA 920 may operate in a long term power save and not receive an address set update.) After a transmission with the recovery address set, AP 910 or STA 920 should update their address sets and recovery address set. In some embodiments, simple devices including IoT-devices may have only the recovery address set in use (e.g., the recovery address set is used to transmit the next burst of frames.)

Example 900 illustrates signaling for updating the randomized address sets.

At 930, STA 920 is associated with AP 910 and updates individual and groupcast address sets.

At 940, STA 920 can transmit a Robust MGMT frame that includes an Address Set Update Request that includes one or more individual address sets. The corresponding parameters of an updated individual address set can include: STA 920 MAC address, UL SN Offset (e.g., SN offset for TID specific SNs), UL individual PN offset, and/or proposed start individual address set time and end time.

At 950, AP 910 can transmit a Robust MGMT frame that includes and Address Set Update Response includes one or more individual address sets, and/or one or more group address sets. An updated individual address set can include: AP 910 MAC address, AID, color field value, DL SN offset (e.g., SN offset for STA specific and TID specific SNs), individual PN offset, and/or corresponding individual address set start and end times. The updated group address set can include: AP 910 MAC address, DL group SN offset, DL group PN offset, TFS offset, change sequence counter value, and/or group address set start and end times.

Figure 10:
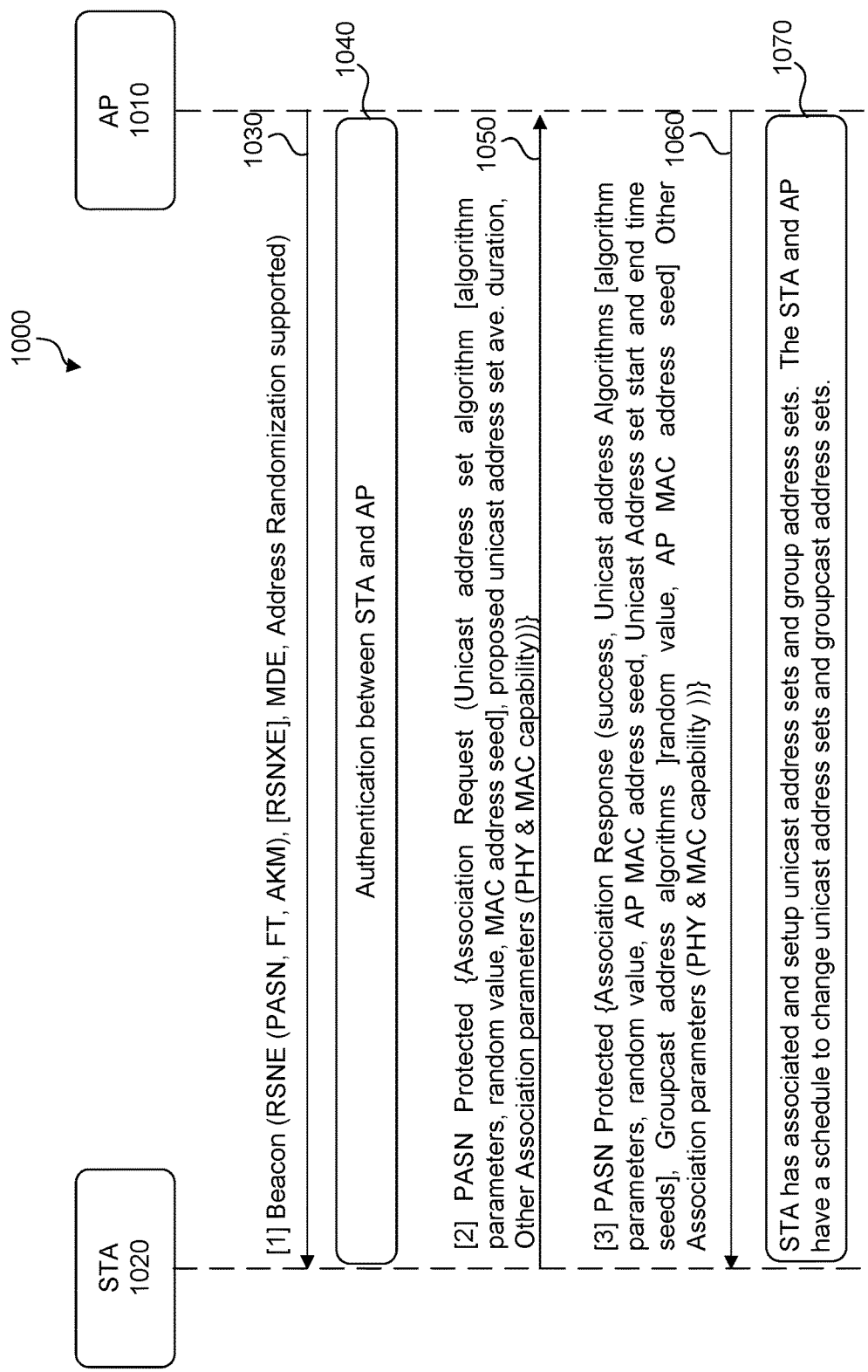
FIG. 10 illustrates an example of signaling for configuring joint algorithms that determine randomized address sets, according to some embodiments of the disclosure.

FIG. 10 illustrates example 1000 of signaling for configuring joint algorithms that determine randomized address sets, according to some embodiments of the disclosure. For explanation purposes and not a limitation, FIG. 10 may be described with reference to elements other figures in the disclosure. For example, AP 1010 can be AP 160 or one of PE AP 110a-110c of FIG. 1, and STA 1020 can be STA 130, STA 180, STA 170, or one of PE non-AP STA 120a-120c of FIG. 1.

The association may configure joint algorithms to update the address set parameters during the association. In association signaling, AP 1010 and STA 1020 can agree on set of joint algorithms to calculate individual address sets and group address sets. The algorithms may also configure address set transition times and the number of address sets in use. The associated AP (e.g., AP 1010) may change the algorithms or the parameter values used for address sets. For example, if a STA has disassociated from a BSS, a change of the groupcast address set algorithm ensures that only associated STAs (e.g., STA 1020) can know the next address of the AP. Alternatively, AP 1010 can maintain the algorithms for group address sets, so that STAs that reassociate with AP 1010 may calculate the current AP parameters and discover AP 1010.

The Association Request frame may also contain the MAC-SAP MAC Address of the STA 1020 that STA 1020 uses in frames encryption and the frame may include the MAC address STA 1020 uses for authentication and association. Similarly, the Association Response may contain the MAC-SAP MAC Address of AP 1010 that AP 1010 uses in frame encryption and the frame may include the MAC address AP 1010 uses for authentication and association At 1030, AP 1010 may transmit a Beacon frame that may signal support for address randomization and minimum number of individual address sets in association. The Beacon frame can include RSNE that includes an indication of: PASN protocol, FT, AKM, RSNXE, MDE, and/or Address Randomization supported.

At 1040, authentication occurs between STA 1020 and AP 1010.

At 1050, STA 1020 transmits a PASN protected Association Request that proposes an individual address set algorithm including: algorithm parameters, a random value, and MAC address seed. The Association Request can also include an average duration for individual address sets, and other association parameters (e.g., PHY & MAC capabilities).

At 1060, AP 1010 can transmit a PASN protected Association Response that includes an indication of success (or not), an individual address algorithm and includes: algorithm parameters, a random value, a first AP MAC address seed, and/or individual address set start and end time seeds. The Association Response can also include a group address algorithm and include a random value and/or a second AP MAC address seed, where the first AP MAC address seed are different. In other words, group addressed transmissions and individual transmissions may be selected independently. For example, MAC Address used for group address transmission cannot be calculated by monitoring the individual addresses. The Association Response can include other association parameters (e.g., PHY & MAC capabilities.)

At 1070, STA 1020 has associated with AP 1010 and has configured individual address sets and/or group address sets as described in Table 1. Individual Address and/or Table 4. Group Address Set. STA 1020 and AP 1010 also have a schedule for changing individual address sets and group address sets.

AP 1010 and STA 1020 use the same algorithms and parameters to calculate the same updated parameters values. In other words, a STA have certain parameter values and a corresponding algorithm for the individual address set. One group address set may be available at a time. The algorithm may use values that are stored by other means, including but not limited to: MAC address seed, Link Id, authentication MAC address, TSF, AID, etc. The joint algorithm ensures that there is no need to signal updates new random address set values to AP 1010 and STA 1020. Accordingly, STA 1020 and AP 1010 power saving are improved and the management traffic overhead is reduced. Further, as the address change is more robust, there is no need to re-authenticate or re-associate, due to lost AP addresses. In some embodiments, the joint algorithm may consume less memory, than storing incoming new parameters.

Figure 11:
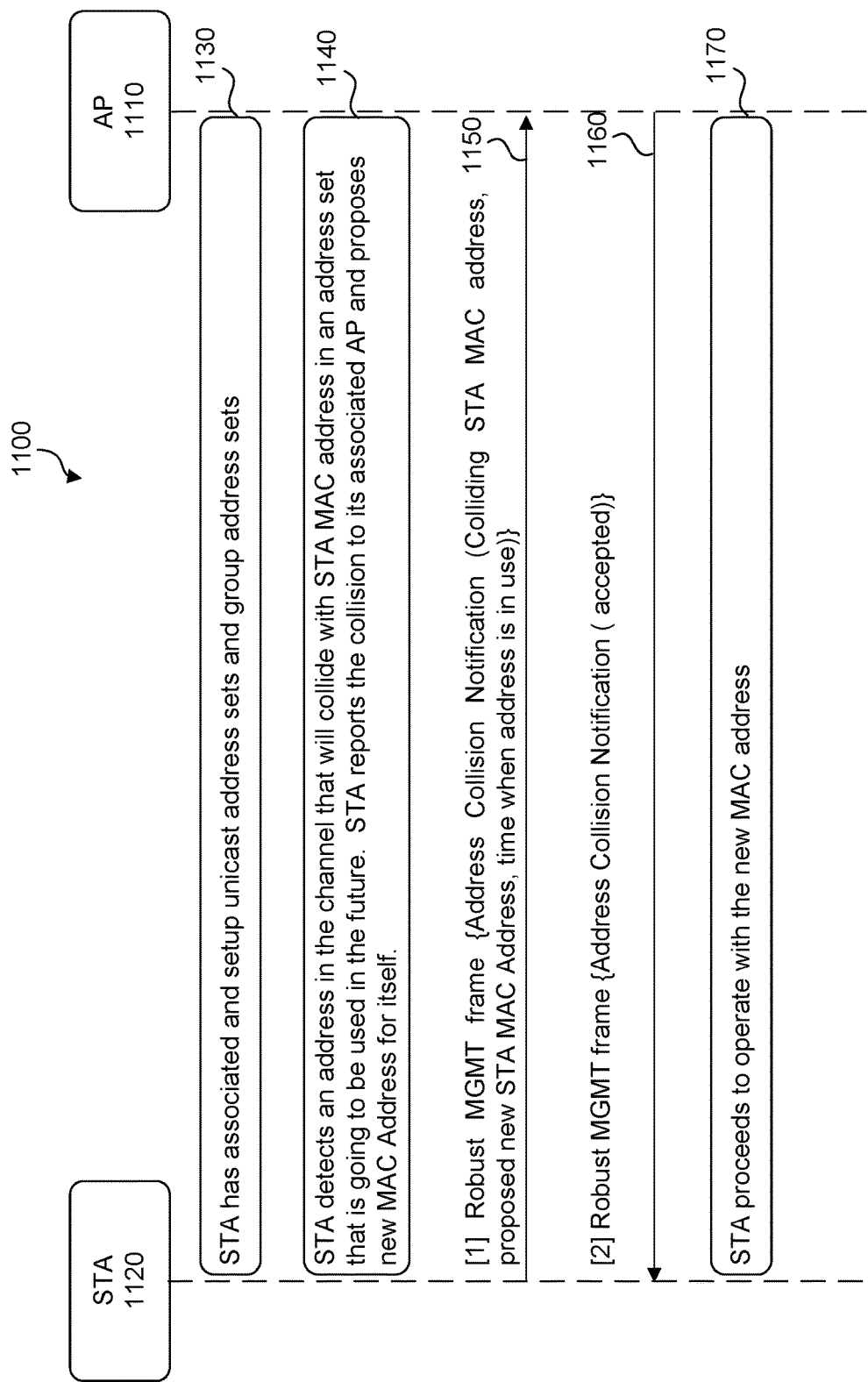
FIG. 11 illustrates an example of signaling for Media Access Control (MAC) address collision detection and avoidance, according to some embodiments of the disclosure.

FIG. 11 illustrates example 1100 of signaling for MAC address collision detection and avoidance, according to some embodiments of the disclosure. For explanation purposes and not a limitation, FIG. 11 may be described with reference to elements other figures in the disclosure. For example, AP 1110 can be AP 160 or one of PE AP 110a-110c of FIG. 1, and STA 1120 can be STA 130, STA 180, STA 170, or one of PE non-AP STA 120a-120c of FIG. 1.

During operations, the random MAC address scheme includes 46 bits that are randomly selected. STA 1120 experiences a collision only if both AP 1110 and STA 1120 individual addresses collide. The receiver checks the transmitter address and receiver address and if the STA is the receiver and associated AP is the transmitter, then the STA will receive a frame that is not targeted to itself. This is very rare situation. An AP MAC address in a group address can experience a collision (e.g., associated AP 1110 has the same MAC address as other AP (not shown).)

To avoid MAC address collisions: STA 1120 may signal colliding MAC Addresses to AP 1110. In some embodiments, STA1120 may propose a new MAC address for itself, STA1120. In some embodiments, STA 1120 may propose that AP 1110 change AP 1110's MAC address, if AP 1110's MAC address collides with other MAC addresses. AP 1110 or a server (not shown) may store the MAC addresses currently in use and/or MAC addresses to be used in the future, and determine whether the MAC addresses currently in use and MAC addresses to be used in the future will collide. In some embodiments, AP 1110 may request that STA 1120 change STA 1120's MAC address to avoid a MAC address that is already in use.

Example 1100 illustrates signaling for MAC address collision detection and avoidance.

At 1130, STA 1120 has associated with AP 1110 and has configured individual address sets and group address sets.

At 1140, STA 1120 detects a MAC address in the channel (e.g., link) that will collide with STA 1120's MAC address in an address set that is going to be used in the future. STA 1120 reports the collision to the the associated AP, AP 1110. The report can include a proposed a new MAC address for STA 1120. (See 1150 below.)

At 1150, STA 1120 can transmit a Robust MGMT frame that includes an Address Collision Notification that can include the following: Colliding STA 1120 MAC address, proposed new STA 1120 MAC address, and a time when the proposed new STA 1120 MAC address is in use.

At 1160, AP 1110 can transmit a Robust MGMT frame that includes an Address Collision Notification that can include an indication of acceptance (or not).

At 1170, STA 1120 proceeds to operate with the new MAC address. (See 1160 above.)

Figure 12:
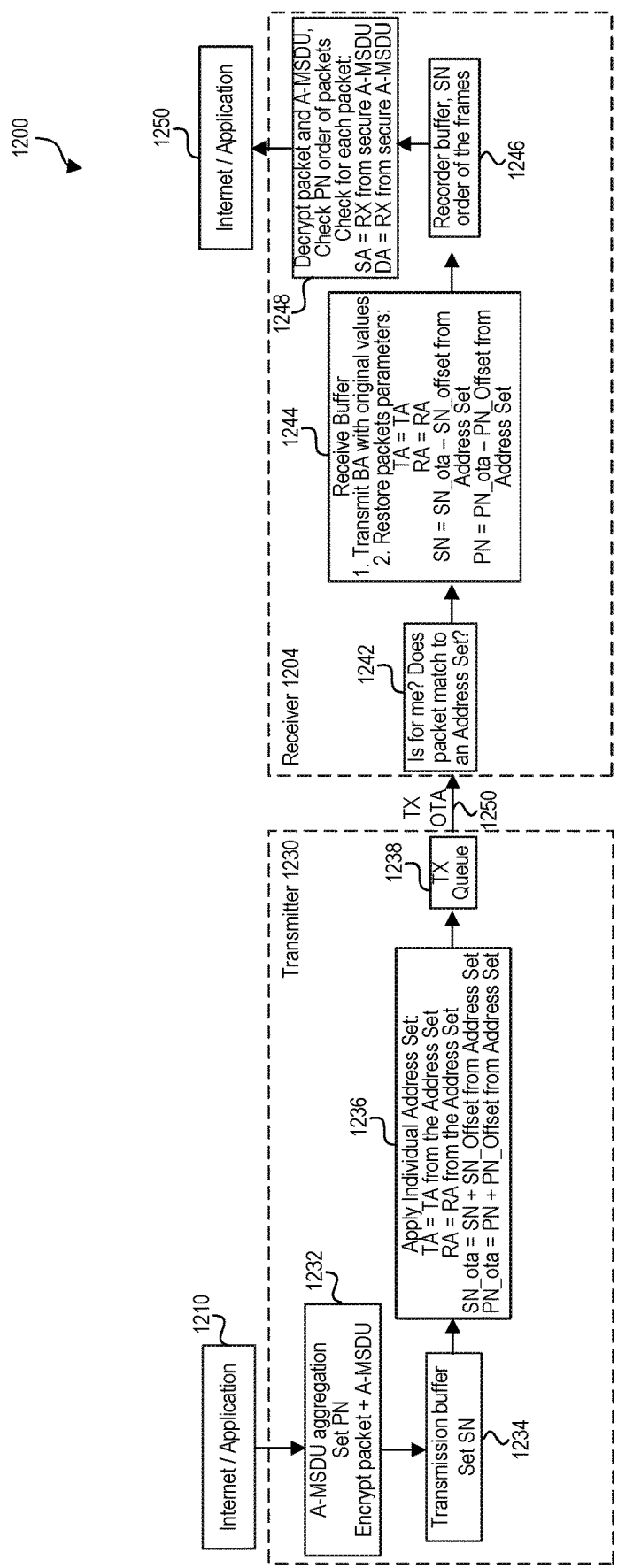
FIG. 12 illustrates an example method for data transmission with randomized address sets, according to some embodiments of the disclosure.

FIG. 12 illustrates example method 1200 for data transmission with randomized address sets, according to some embodiments of the disclosure. For explanation purposes and not a limitation, FIG. 12 may be described with reference to elements other figures in the disclosure. In some embodiments, transmitter 1230 can be AP 160 or one of PE AP 110a-110c of FIG. 1, and receiver 1240 can be STA 170, or one of PE non-AP STA 120a-120c of FIG. 1. In some embodiments, receiver 1240 can be AP 160 or one of PE AP 110a-110c of FIG. 1, and transmitter 1230 can be STA 130, STA 180, STA 170, or one of PE non-AP STA 120a-120c of FIG. 1.

In method 1200, for convenience and not a limitation, transmitter 1230 can be AP 410 of FIG. 4A and receiver 1240 can be associated STA 420 (also referred to as STA 420) of FIG. 4A. AP 410 can receive data corresponding to an Internet/Application, encrypt the data, and apply an individual address set as described herein, where the individual address set modifies only the addresses and parameters transmitted over-the-air (OTA). STA 420 can receive the data, and send block acknowledgement (BA) using the individual address set information. The individual address set application is reversed before the MPDU is decrypted. The MPDU is decrypted and the data sent to the corresponding Internet/Application at 1250. Details of method 1200 are provided below.

At 1210, data corresponding to Internet/Application is generated and sent/delivered through Internet to AP 410 for ultimate transmission to Internet/Application at 1250.

At 1232, AP 410 performs aggregated MAC Service Data Unit (A-MSDU) aggregation to form a MAC Protocol Data Unit (MPDU). AP 410 assigns a packet number (PN) corresponding to the MPDU and encrypts a portion of the MPDU (e.g., a payload portion of the MPDU).

At 1234, a sequence number (SN) corresponding to the encrypted MPDU is set.

At 1236, AP 410 applies an individual address set as described in Table 1. Individual Address such as Set 1 411 of FIG. 4. Accordingly, the address fields in the MAC header can be updated such that the Transmitting Address (TA) corresponds to the $BSSID_{unicast}$ of AP 410 of the individual address set 411, and the Receiving Address (RA) corresponds to STA Link $Address_{unicast}$ of STA 420. In addition, AP 410 can create an over-the-air (OTA) packet number ($PN_{OTA}$) that is different than the PN corresponding to the MPDU, where the $PN_{OTA}$ is transmitted OTA at 1250. The $PN_{OTA}=PN+PN_{Offset}$, where the offset PN ($PN_{Offset}$) is the PN $Offset_{unicast}$ of individual address set 411. AP 410 can also create an over-the-air (OTA) sequence number ($SN_{OTA}$) that is different than the SN corresponding to the MPDU (e.g., see 1234 above), wherein the $SN_{OTA}$ is transmitted OTA at 1250. The $SN_{OTA}=SN+SN_{Offset}$, where the offset SN ($SN_{Offset}$) is the SN Offset $(TID)_{unicast}$ of individual address set 411.

At 1238, AP 410 transmits the corresponding data from the transmission queue in transmission OTA 1250 to receiver 1240 (STA 420).

At 1242, STA 420 determines whether the transmission is intended for STA 420 by determining whether the RA and TA correspond to individual address set 411.

At 1244, in a receive buffer of STA 420, STA 420 generates and transmits block acknowledgement (BA) with the received values. Subsequently, STA 420 restores the MPDU parameters using the individual address set 411 parameters. For example, STA 420 can determine the PN using $PN_{OTA}$ of $PN_{Offset}$ of the individual address profile 411, and determine the SN using the $SN_{OTA}$ and $SN_{Offset}$ of individual address set 411, where the PN and the SN correspond to the MPDU. The PN and SN can be determined by the following equations: $PN=PN_{OTA}-PN_{Offset}$ and $SN=SN_{OTA}-SN_{Offset}$.

At 1246, STA 420 can reorder the frames based on the SN.

At 1248, STA 420 can decrypt the encrypted portion of the MPDU, check the PN order of the MPDUs, and check for each MPDU whether the Source Address (SA) and Destination Address (DA) are received from the secure A-MSDU.

At 1250, the data is sent to the corresponding Internet/Application.

Figure 14A:
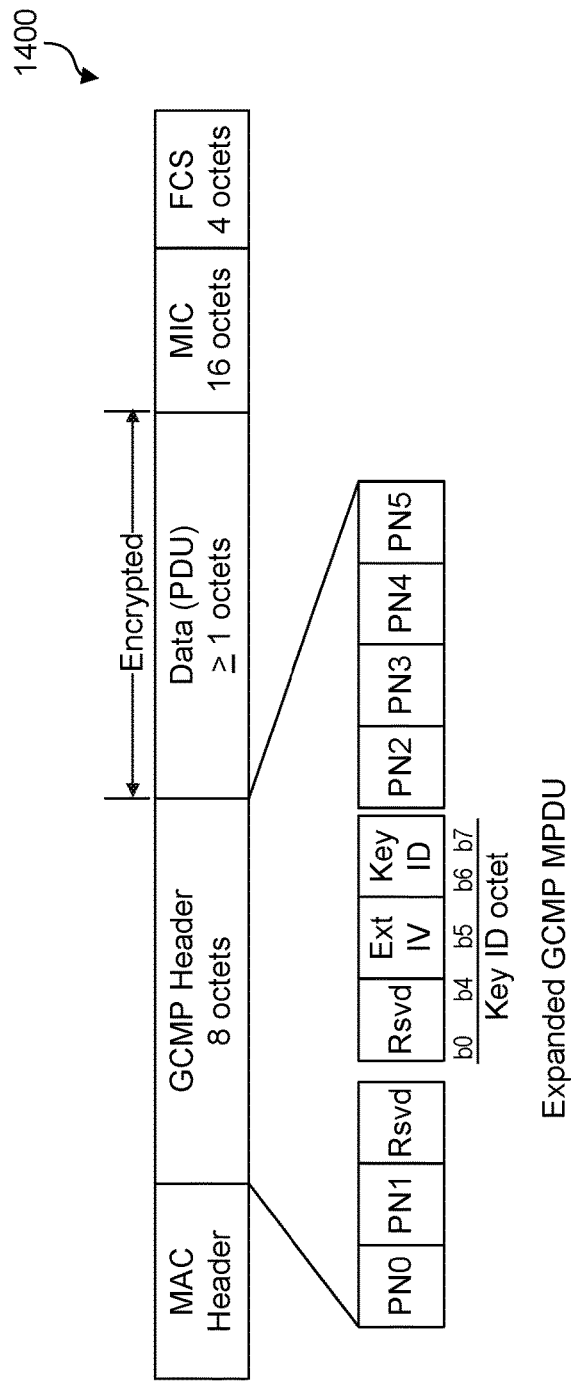
FIG. 14A illustrates an example of an expanded Galois/counter mode (GCM) protocol (GCMP) MAC Protocol Data Unit (MPDU).

FIG. 13A illustrates diagram 1300 showing data that is delivered to Galois/counter mode (GCM) encryption as described in IEEE P802.11REVme. Diagram 1300 includes construct additional authentication data (AAD) 1320, construct GCM protocol (GCMP) header 1330, and GCM encryption 1310 to form an encrypted MPDU. The GCM Headers include the PN of the MPDU. The PN number of a transmitter is increasing monotonically and the PN can be used to trace the transmitter as shown in FIG. 14A illustrating example 1400 of an expanded GCMP MPDU. To protect identities of a STA (or an AP), the individual address set or group address set should modify the PN number. In some embodiments, an individual address set or a group address set includes an offset PN value that is different than the PN so that tracking between address sets is not possible.

FIG. 13B illustrates example 1350 of an encryption block diagram supporting randomized address sets, according to some embodiments of the disclosure. Some embodiments improve privacy of MAC addresses and thus, wireless communications while minimizing impacts to encryption processes. For example, $PN_{OTA}$ that is transmitted OTA is added after the encryption of the A-MSDU. In addition, additional authentication data (AAD) construction is done with predefined addresses of the STA and the AP. This means that encryption uses the STA and AP addresses that are not transmitted OTA. The OTA transmitted address belonging to an individual address set or a group address set is changed first to the non-changing static address of the STA and AP. The MAC Addresses and SN of the OTA transmitted packet are changed and the updated MAC header is prepended to the output of GMC encryption module 1310. The updated operations in a transmitter (e.g., transmitter 1230 of FIG. 12) are shown in example 1350 below as follows: At 1362 the $PN_{OTA}$ is calculated by adding $PN_{Offset}$ to PN. At 1364, the $PN_{OTA}$ is inserted to GCMP Header (shown in FIG. 14A). At 1380, SN, transmitter address (TA), and receiver address (RA) of the MAC header are modified for OTA transmission.

Example 1350 illustrates how parameters (e.g., $PN_{Offset}$, $SN_{Offset}$) in individual address set profiles and/or group address set profiles can be used to generate over-the-air (OTA) parameters (e.g., $PN_{OTA}$, $SN_{OTA}$). Example 1350 illustrates at 1360 of $PN_{Offset}$ being added at 1362 and construct GCM header 1364 so that the offset PN can be calculated as:

$PN_{OTA}=PN+PN_{Offset}$

Figure 14B:
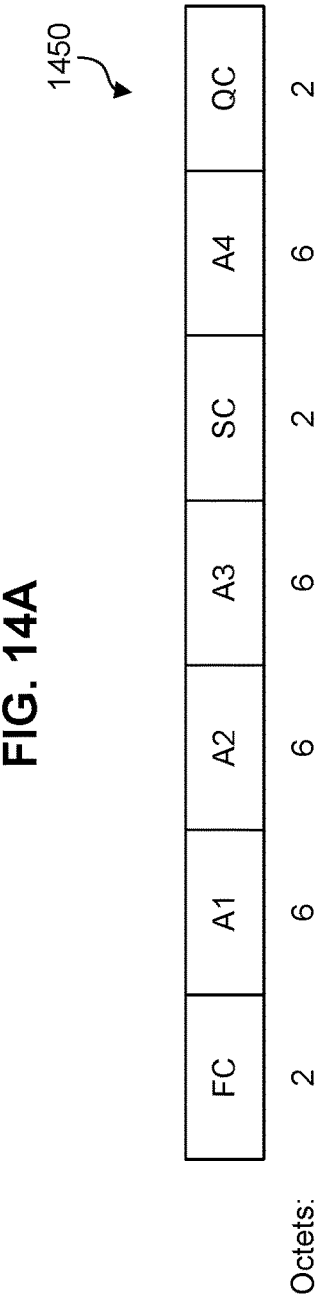
FIG. 14B illustrates an example of additional authentication data (AAD) for protocol version 0 (PV0) MPDU.

The AAD is used in encryption (for transmission) and decryption (for reception) of a frame that includes the A-MSDU. FIG. 14B illustrates example 1450 of an AAD for a protocol version 0 (PV0) MPDU. The AAD includes an MPDU Frame Control field, addresses of the encrypted/decrypted frame, MPDU Sequence control fields (bits 0-3 are present, other bits are masked to 0), QoS Control field (bits 0-3 and bit 7 if A-MSDU capable STA are present, other bits are masked to 0). If either of To Distributed System (DS) or From DS subfields of the MAC header of the MPDU is set to 1, and the MPDU is an individually addressed data frame between an AP MLD and a non-AP MLD associated with the AP MLD, then A1 is set to the MLD MAC address of the intended receiver MLD of the MPDU and A2 is set to the MLD MAC address of the transmitting MLD of the MPDU. Otherwise, A1 is set to the MPDU Address 1 field, and A2 is set to the MPDU Address 2 field. If MPDU Address 3 field is BSSID and the MPDU is an individually addressed data frame between an AP MLD and a non-AP MLD associated with the AP MLD, then A3 is set to the MLD MAC address of the AP MLD, where the corresponding AP with the BSSID is affiliated with the AP MLD. Otherwise, A3 is set to the MPDU Address 3 field, and A4, if present, is set to the MPDU Address 4 field. At 1380, OTA SN of the MAC header is generated as $SN_{OTA}=SN+SN_{Offset}$.

Figure 22A:
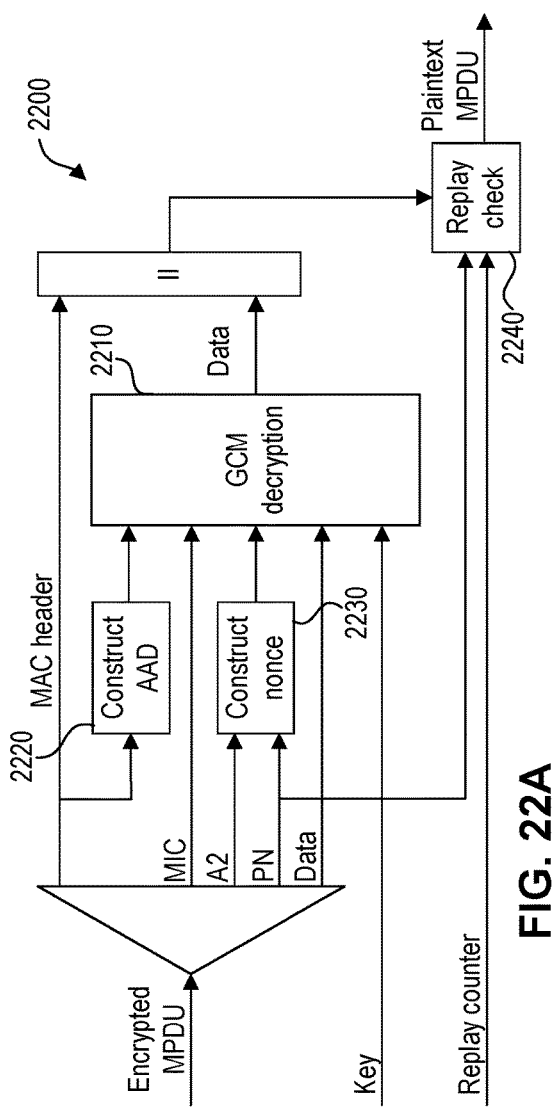
FIG. 22A illustrates a diagram showing data that is delivered to Galois/counter mode (GCM) decryption.

FIG. 22A illustrates diagram 2200 showing decryption of encrypted MPDU that is delivered to Galois/counter mode (GCM) decryption module as described in IEEE P802.11REVme. Diagram 2200 illustrates parsing the input encrypted MPDU to construct AAD and nonce values. At 2220, AAD is constructed from the MPDU header of the encrypted MPDU. At 2230, nonce is constructed from the A2 and PN fields. The constructed AAD, data (which is the encrypted frame body of the plaintext MPDU), message integrity check (MIC), and the constructed nonce are input to GMC decryption module 2210 to generate the plaintext data. The received MPDU header and the MPDU plain text from the GCM decryption function are concatenated to form a plaintext MPDU.

Figure 22B:
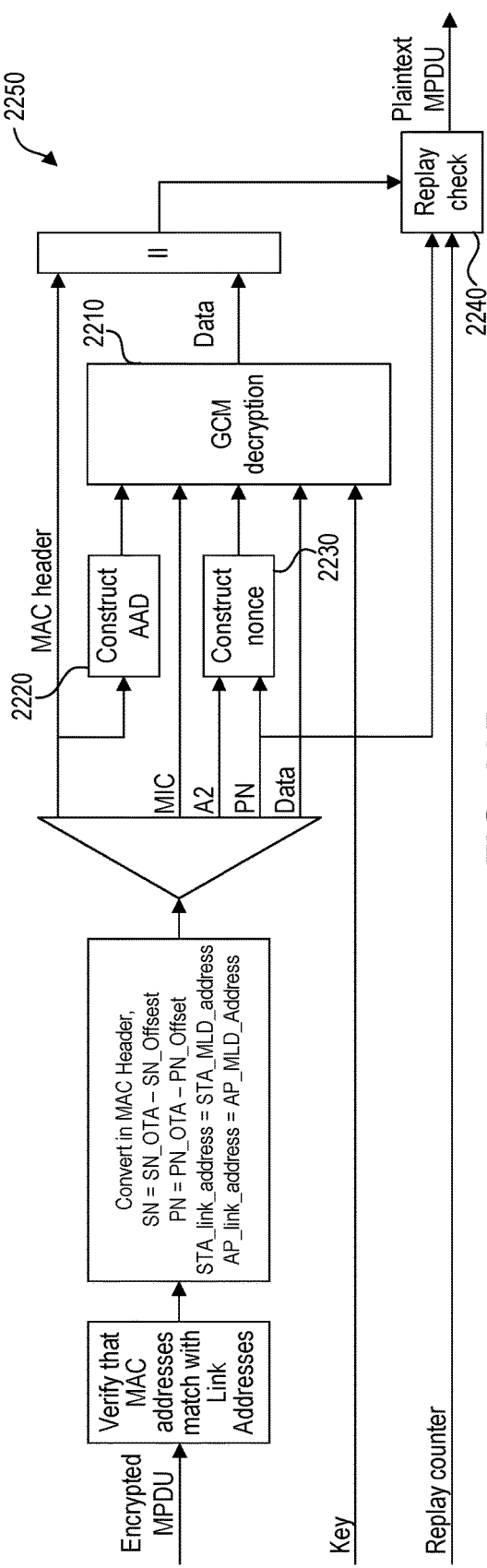
FIG. 22B illustrates an example of an decryption block diagram supporting randomized address sets, according to some embodiments of the disclosure.

FIG. 22B illustrates example 2270 of a decryption block diagram supporting randomized address sets, according to some embodiments of the disclosure. At 2250, the receiver verifies whether the MAC addresses of the MPDU the match with the link addresses of the receiver. At 2260, the parameters in the MAC header that were modified at 1380 of the example 1350 are restored to the original values. The SN and PN are restored by subtracting the offsets added at the transmitter ($SN=SN_{OTA}-SN_{Offset}$ from Address Set and $PN=PN_{OTA}-PN_{Offset}$ from Address Set). Further, at 2260, the STA link address can be set to STA MLD address and the AP link address is set to AP MLD address. The input encrypted MPDU with updated MAC header is parsed to construct AAD and nounce values at 2220 and 2230, respectively. The constructed AAD, the data (which is the encrypted frame body of the plaintext MPDU), the message integrity check (MIC), and the constructed nonce are input to GMC decryption module 2210 to generate the plaintext data. The received MPDU header and the MPDU plain text from the GCM decryption function are concatenated to form a plaintext MPDU.

In some embodiments, when an individual address set or a group address set is in use the MAC addresses of packets received OTA are changed back to MAC-SAP addresses of the AP and the STA. In some embodiments, the legacy MAC Address split into 3 addresses. These addresses are the same as in MLD MAC Address. The MAC-SAP address is used in all encryption and decryption operations to avoid changes to encryption and decryption procedures.

The receiver checks the addresses of a received frame before applying the AAD parameters. The check ensures that the received frame is addressed according to address set rules (see Table 2. Rules for APs and STAs that use Address Randomization) that are currently in use. In some embodiments, for a MLD (e.g., 802.11be case) the OTA MLD addresses (described below at FIG. 17) are in use, and AAD obtaining has been changed for 802.11be MLDs. Some embodiments change the link addresses to the MLD-SAP addresses. The use of the same MLD-SAP address ensures that encrypted MPDU may be transmitted over any link by changing only the address set specific parameter values and without need to redo the encryption (e.g. decrypt and re-encrypt) the MPDU. The receiver checks that the MAC Addresses of an MPDU received OTA match with the address profile in use, but the AAD used in the encryption uses the initial MAC Addresses.

Some embodiments include rules to randomize selected parameters as shown below in Table 5. Rules to Randomize Selected Parameters.

TABLE 5

Rules to Randomize Selected Parameters

| Randomized Parameter | Uniqueness | Randomization Procedure | Are Collisions Possible? |
|---|---|---|---|
| MAC address | Unique for operating channels | MAC address the individual/group bit not randomized The Local/Global bit is set to Local value. All other 46 bits are randomized | Yes, a collision needs to be solved |
| Association ID (AID) | Unique within AP | The AP allocates AID values for STAs. AP shall not allocate a value that is used for group frames indication. AP may select the values so that bits used in a traffic indication map (TIM) element is efficient (the size of TIM element is minimized), e.g., AP may select a range of values and randomly allocate values within this range to the AP's associated STAs | No, AP allocates all values |
| Color Value | Semi-unique for operating channels | The Color value is randomly selected. AP has Color value that is used for UL and DL transmissions to AP | Yes, a collision may be ignored |
| Sequence Number (SN) | Unique within AP MLD, SNS, TID and receiver | The initial SN is randomized. AP may select sequence number offset for each SN in use. The SN value is calculated as $SNO_{TA} = (SN + SN_{OFFSET})$ Mod 4096 | No. AP manages the SN that it transmits and STA manages SN that it transmits |
| Packet Number (PN) | Unique within AP MLD, TID and receiver | The initial Packet Number is randomized. The PN is 6 octet long value that monotonically increases. When new $PN_{OFFSET}$ is $PN_{OTA}$ can be calculated: $PN_{OTA} = (PN + PN_{OFFSET})$ Mod $2^{63}$, where $PN_{OFFSET}$ is a random integer($2^{64}$) AND $0 < PN < MAX(2^{64})$ The $PN_{OFFSET}$ is a random signed 64 bit long integer. | No. AP manages the PN that it transmits and STA manages PN that it transmits |
| Time Synchronization Function (TSF) | Unique within AP | The lowest 56 bits of the TSF value are randomized when AP is created or if an AP changes the AP's MAC addresses | No. this is AP specific value |

In some embodiments, PE MLDs implement two levels of MAC address randomization. In a first level of MAC address randomization, BSS/AP link specific addresses can be randomized. In other words, addresses corresponding to a link of an MLD are randomized separately from other links of the MLD. Thus, each link may have own individual and group address sets. And, each link may have a separate algorithm or algorithm parameters to randomly select the link-specific MAC addresses. This is similar to the examples of systems 400 and 500 of FIGS. 4A and 5A for single link devices.

Figure 15:
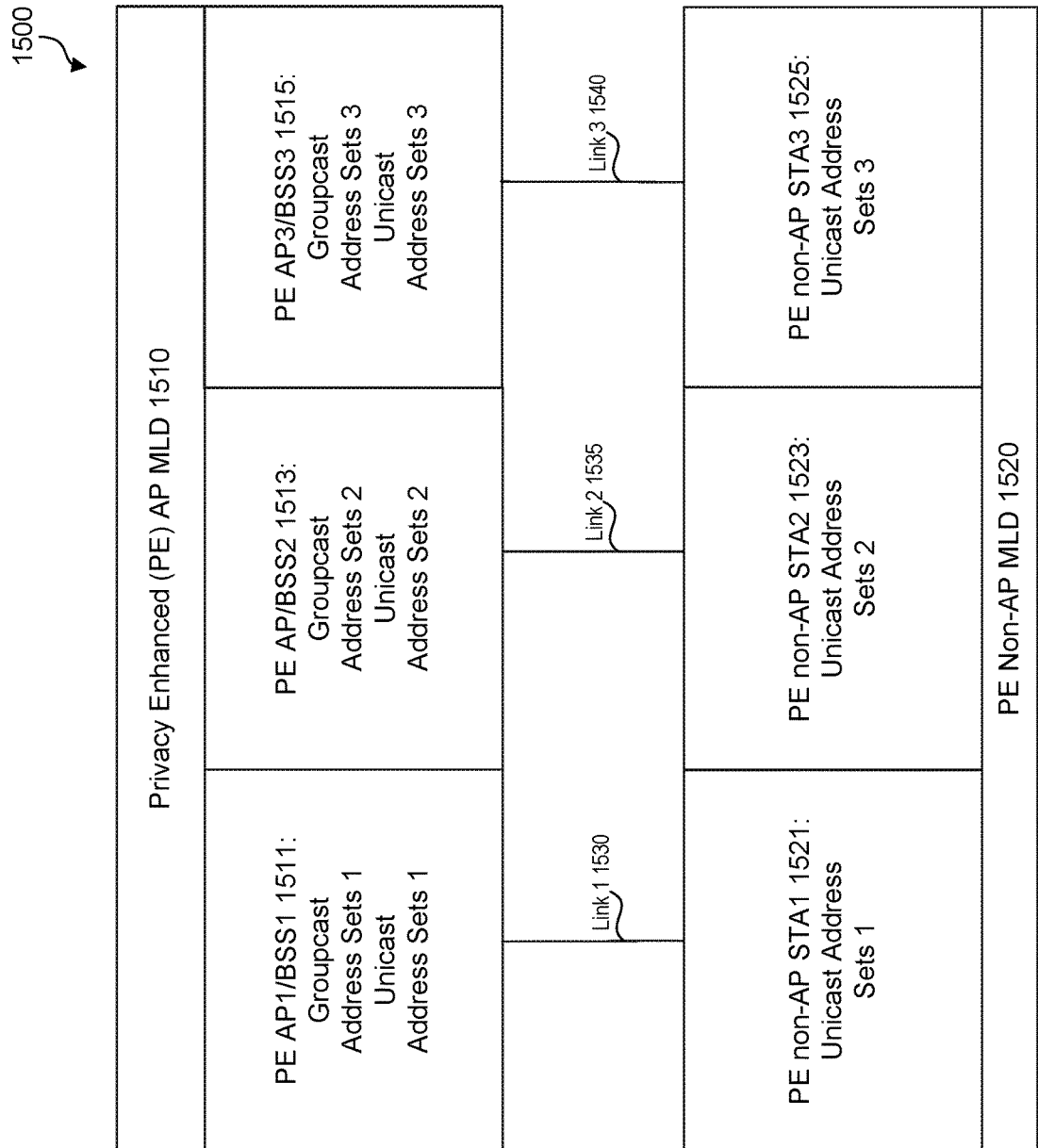
FIG. 15 illustrates an example privacy enhanced (PE) multi-link device (MLD) system supporting address randomization schemes, according to some embodiments of the disclosure.

FIG. 15 illustrates example privacy enhanced (PE) multi-link device (MLD) system 1500 supporting address randomization schemes, according to some embodiments of the disclosure. For explanation purposes and not a limitation, FIG. 15 may be described with reference to elements from FIG. 1. For example, PE AP MLD 1510 includes 3 affiliated PE APs: PE AP1 1511, PE AP2 1513, and PE AP3 1515 can be PE AP MLD 110 that includes affiliated PE AP 110a-110c of FIG. 1. PE non-AP MLD 1520 includes 3 affiliated PE non-AP STAB: PE non-AP STA1 1521, PE non-AP STA2 1523, PE non-AP STA3 1525 that can be PE non-AP MLD 120 with affiliated PE non-AP STA 120a-120c of FIG. 1. PE AP MLD 1510 communicates over corresponding links: link 1 1530, link 2 1535, and link 3 1540 with PE non-AP MLD 1520.

For example, PE AP1 1511 operates BSS1 and communicates over link 1 1530 to PE non-AP STA1 1521. PE AP1 1511 can establish multiple individual address sets with PE non-AP STA1 1521 where the multiple individual address sets identified as Unicast Address Sets 1 in system 1500 can be used in communications over link 1 1530. In addition, multiple group address sets identified as Groupcast Address Sets 1 can be established for communications over link 1 1530. PE AP2 1513 operates BSS2 and communicates over link 2 1535 to PE non-AP STA2 1523. PE AP2 1513 can establish multiple individual address sets with PE non-AP STA2 1523 where the multiple individual address sets identified as Unicast Address Sets 2 in system 1500 can be used in communications over link 2. Multiple group address sets identified as Groupcast Address Sets 2 can be established for communications over link 2 1533. And, PE AP3 1515 operates BSS3 and communicates over link 3 1540 to PE non-AP STA3 1525. PE AP3 1515 can establish multiple individual address sets with PE non-AP STA3 1525 where the multiple individual address sets identified as Unicast Address Sets 3 in system 1500 can be used in communications over link 3. Multiple group address sets identified as Groupcast Address Sets 3 can be established for communications over link 3 1540.

In a second level of MAC address randomization, MLD addresses as well as MLD-level identifiers and parameters are randomized at the MLD level. In other words, there are no common unencrypted MLD addresses or MLD indentifiers and parameters that are transmitted over the air. Having MLD level addresses, identifiers, and parameters randomized at the MLD level ensures that PE APs affiliated with a PE AP MLD may operate independently, and PE non-AP STAs affiliated with a PE non-AP MLD may operate independently.

Figure 16:
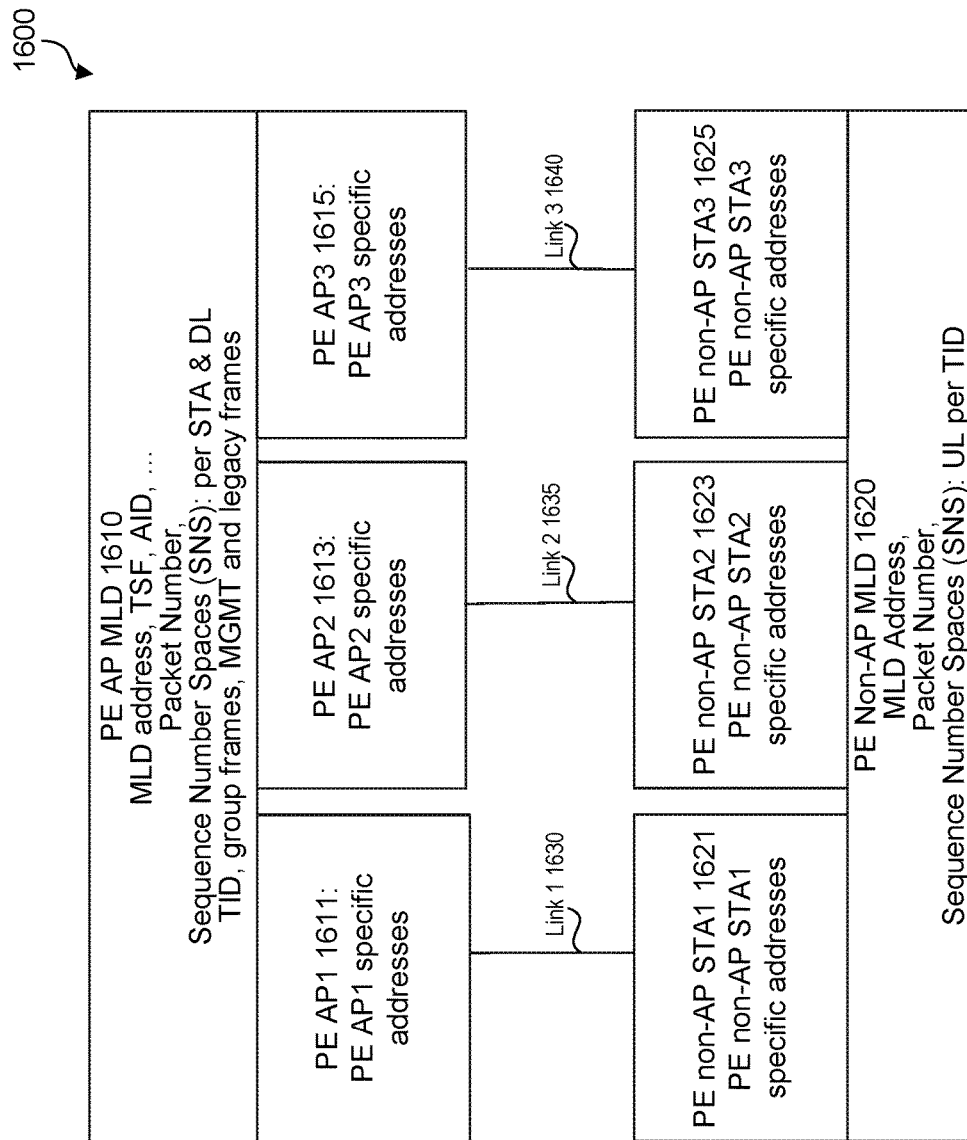
FIG. 16 illustrates an example PE MLD system including address and identifier randomization, according to some embodiments of the disclosure.

FIG. 16 illustrates example PE MLD system 1600 including address and identifier randomization, according to some embodiments of the disclosure. For explanation purposes and not a limitation, FIG. 16 may be described with reference to elements from FIG. 15. For example, PE AP MLD 1610 can be PE AP MLD 1510 and PE non-AP MLD 1620 can be PE non-AP MLD 1520 of FIG. 15. System 1600 includes PE AP MLD 1610 that includes 3 affiliated PE APs: PE AP1 1611, PE AP2 1613, and PE AP3 1615 that communicate over corresponding links: link 1 1630, link 2 1635, and link 3 1640 with PE non-AP MLD 1620. PE non-AP MLD 1620 includes 3 affiliated PE non-AP STAs: PE non-AP STA1 1621, PE non-AP STA2 1623, PE non-AP STA3 1625.

PE AP MLD 1610 MLD-level parameters are randomized and used in the 3 affiliated PE APs. These MLD-level parameters have separate values in each of affiliated PE AP1 1611, PE AP2 1613, and PE AP3 1615, so that an attacker (e.g., a bad actor) may not know in which links (e.g., link 1 1630, link 2 1635, and link 3 1640) PE AP MLD 1610 operates. Each of affiliated PE AP1 1611, PE AP2 1613, and PE AP3 1615 can maintain separately and hide MLD-level parameters that include but are not limited to: MLD address, TSF, AID, PN, Sequence Number Spaces (SNS): per STA & DL TID, group frames, MGMT frames and/or legacy frames. PE AP MLD 1610's MLD address can be encrypted so that attackers do not detect the affiliated PE AP1 1611, PE AP2 1613, and PE AP3 1615 that belong to PE AP MLD 1610. SN and PN counters are maintained at the MLD level. Thus, PE AP MLD 1610 should modify SN and PN packet values for each link separately. Each link (e.g., link 1 1630, link 2 1635, and link 3 1640) may have a corresponding TSF value. The TSF values should be changed independently from other link-specific TSF values of other links to make affiliated PE AP tracing difficult.

PE non-AP MLD 1620 MLD-level parameters are used in 3 affiliated PE non-AP STAs. These MLD-level parameters have separate values in each of affiliated PE non-AP STA1 1621, PE non-AP STA2 1623, PE non-AP STA3 1625, so that an attacker may not know in which links the PE non-AP MLD 1620 operates. Each of affiliated PE non-AP STA1 1621, PE non-AP STA2 1623, PE non-AP STA3 1625 can maintain separately and hide MLD-level parameters including but not limited to: MLD Address, PN, SNS: UL per TID. PE non-AP MLD 1620 MLD address should be encrypted so that attackers do not detect the affiliated PE non-AP STA1 1621, PE non-AP STA2 1623, PE non-AP STA3 1625 that belong to PE non-AP MLD 1620.

Figure 17:
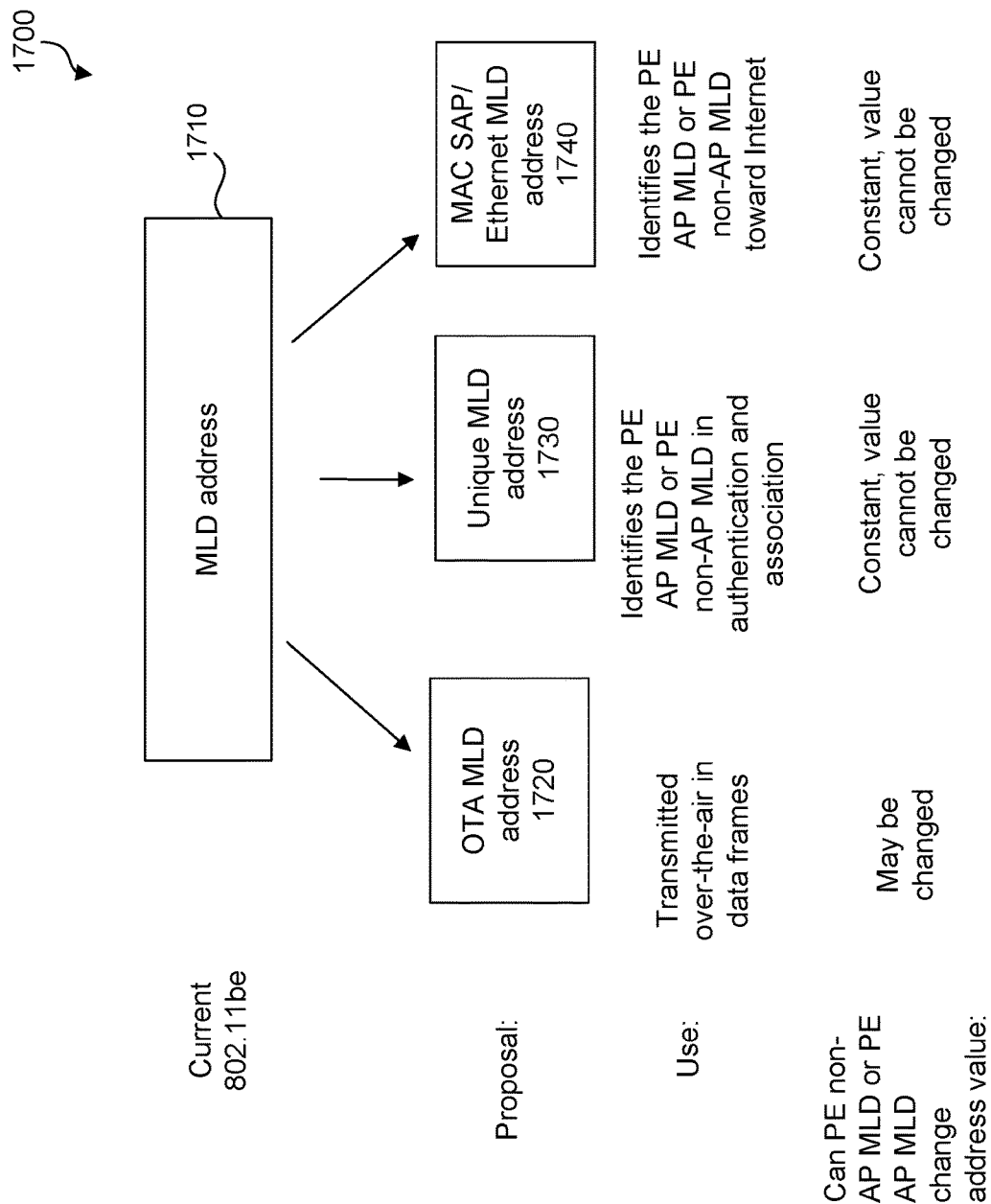
FIG. 17 illustrates an example of multiple MLD address types for address randomization, according to some embodiments of the disclosure.

FIG. 17 illustrates example 1700 of multiple MLD address types for address randomization, according to some embodiments of the disclosure. In some embodiments, an MLD address transmitted over-the-air (OTA) can be changed and randomized. Example 1700 includes MLD address 1710 that can be an IEEE 802.11be MLD address. MLD address 1710 can be one of 3 different addresses: i) Unique MLD address 1730 that identifies the MLD (e.g., PE AP MLD or PE MLD) in authentication and association. Unique MLD address 1730 is a constant value for a PE MLD and cannot be changed; ii) MAC service access point (SAP) address 1740 that can be a MAC address that identifies the non-AP MLD toward the Internet (e.g., is visible to APs that are Ethernet connected to the Internet. This MAC address may be used in the MPDUs encryption and decryption. The encryption is done with the SAP address and after encryption, the MAC addresses in OTA packet are changed to OTA MAC Addresses. Similarly in the decryption, the OTA addresses are first checked to match with link specific address and then the SAP address is used in the decryption. MAC SAP address 1740 is a constant value and cannot be changed; and iii) OTA MLD address 1720 that may be transmitted in Address 3 of a data frame. (See IEEE P802.11REVme.) In some embodiments, a PE non-AP MLD can change and encrypt an OTA MLD address value. In some embodiments, OTA MLD address 1720 can be the same as MAC SAP address 1740. OTA MLD address 1720 may be the same as MAC SAP address 1740 when a portion of an MPDU comprising an MLD address is encrypted.

A PE AP MLD and a PE non-AP MLD have also link specific addresses that are used in each link separately. The link specific addresses are used to identify the PE AP and the PE non-AP STA in the link. Each PE AP in the PE AP MLD shall have unique link specific MAC address values. PE non-AP STAs in a PE non-AP MLD may have the same link MAC Address in different links. The individual address set defines the link specific MAC Addresses that are used for individual frames transmission. Similarly, the group address set defined link address that a PE AP uses to transmit the group frames.

Figure 18:
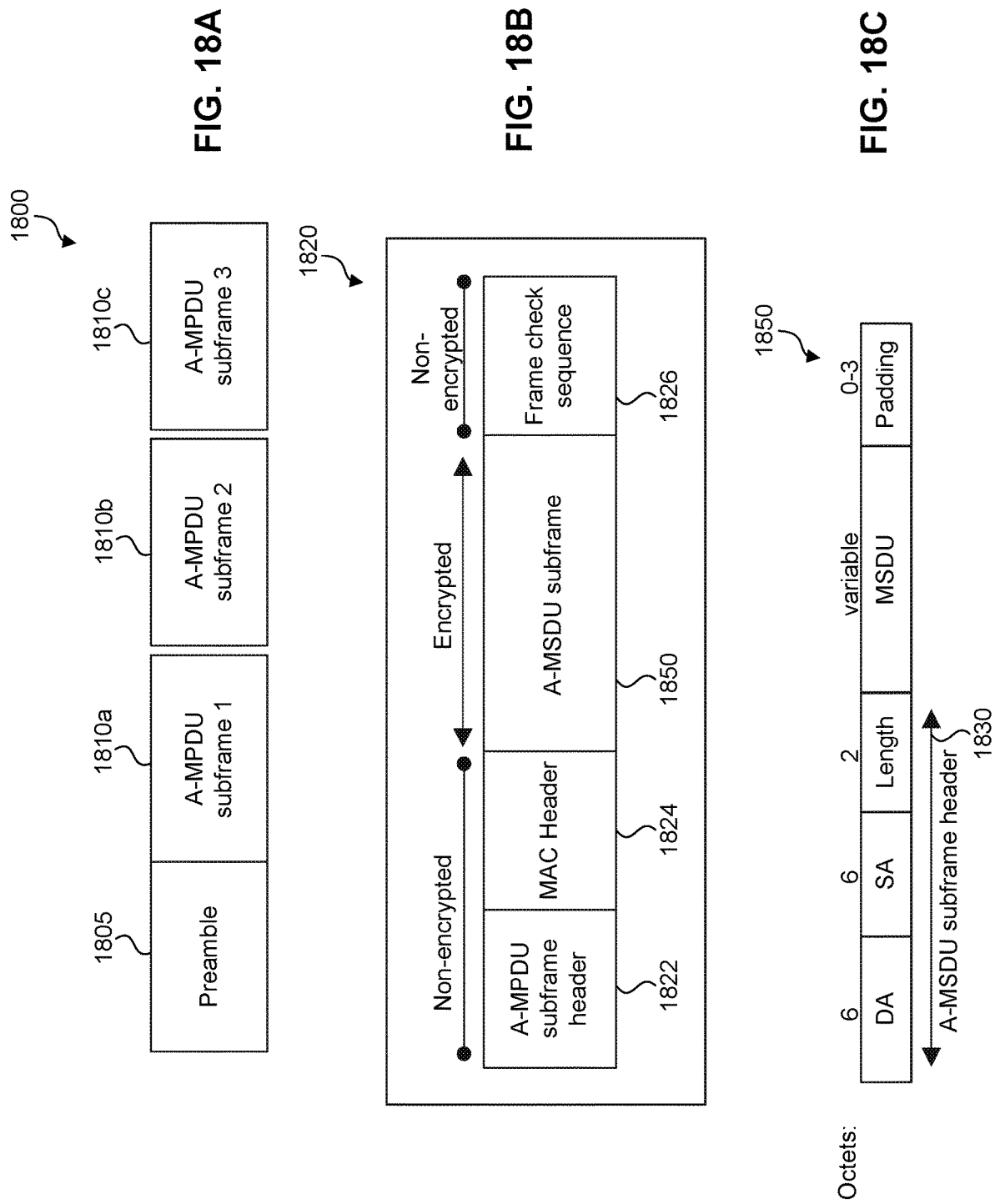
FIG. 18A illustrates an example of a data transmission supporting PE MLD randomized address, according to some embodiments of the disclosure.
FIG. 18B illustrates an example MPDU of a portion of an Aggregate MPDU (A-MPDU) subframe including an encrypted MLD address, according to some embodiments of the disclosure.
FIG. 18C illustrates a basic A-MAC Service Data Unit (A-MSDU) subframe structure.

FIG. 18A illustrates example 1800 of a data transmission supporting PE MLD randomized address, according to some embodiments of the disclosure. Example 1800 illustrates data transmission of a PHY protocol data unit (PPDU) including preamble 1805, and aggregate MPDU (A-MPDU) subframes 1810a-1810c that may be transmitted OTA.

FIG. 18B illustrates example MPDU 1820 of a portion of an A-MPDU subframe 1810 including unencrypted A-MPDU subframe header 1822 and MAC header 1824, encrypted A-MSDU subframe 1850, and unencrypted frame check sequence 1826, according to some embodiments of the disclosure. For explanation purposes and not a limitation, FIG. 18B may be described with reference to elements from other figures in the disclosure. For example, example MPDU 1820 can be created by PE AP MLD 1610 and/or PE non-AP MLD 1620 of FIG. 16. In some embodiments, MPDU 1820 can be a portion of A-MPDU subframe 1810 of FIG. 18A, where A-MPDU 1810 may also include an MPDU delimiter field and variable length padding.

FIG. 18C illustrates basic A-MSDU subframe structure 1850 that is encrypted as shown in A-MPDU subframe 1820. A-MSDU subframe structure includes A-MSDU subframe header 1830, an MSDU of variable length and variable length padding. In some embodiments, A-MSDU subframe header 1830 may comprise encrypted MLD addresses and unencrypted MAC header 1824 may comprise link specific MAC addresses. For example, MLD Addresses can be present in a Source Address (SA) or a Destination Address (DA) of A-MSDU subframe header 1830. In some embodiments, OTA MLD address 1720 can be present in SA or DA of A-MSDU subframe header 1830. In some embodiments, OTA MLD address 1720 present in SA or DA of A-MSDU subframe header 1830 can be same as MAC SAP address 1740. Thus, PE AP MLD 1610 and PE non-AP MLD 1620 may encrypt A-MSDU subframe header 1830 to protect an MLD address that may be in the SA or DA fields. The SA and DA may be addresses in Ethernet, Wi-Fi mesh addresses or MLD addresses, depending on the final destination of the frame. This is different than transmissions that typically transmit A-MSDU subframe header 1830 unencrypted.

Figure 19:
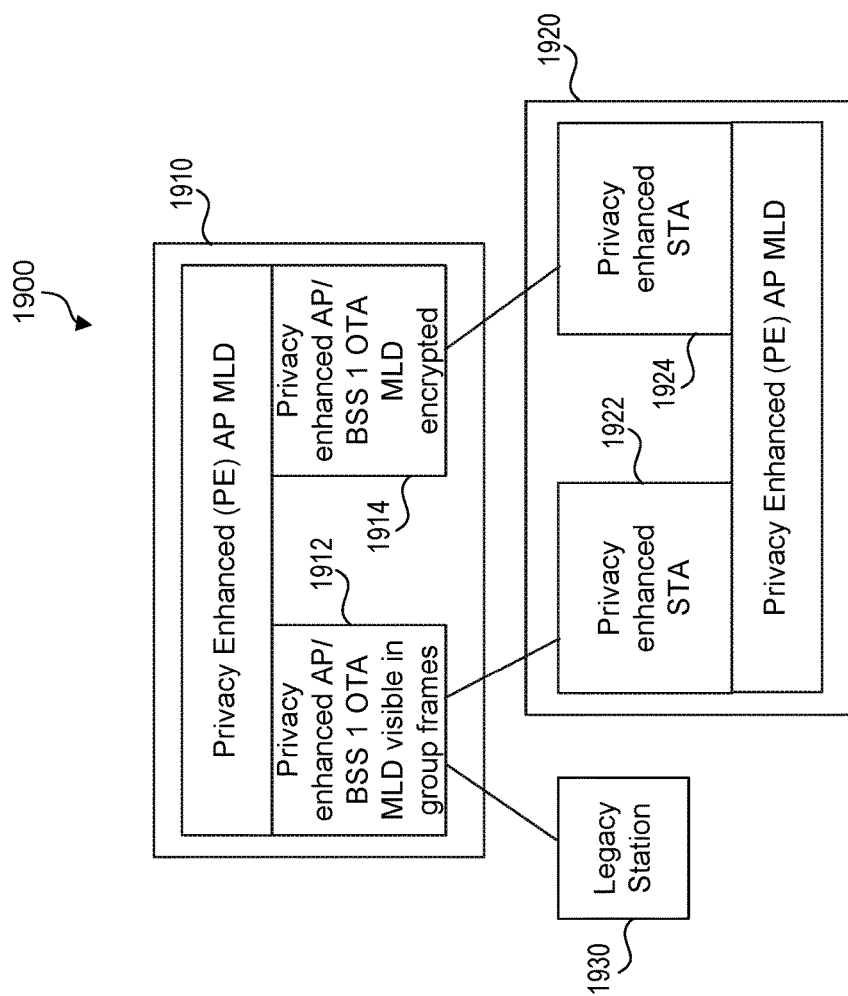
FIG. 19 illustrates an example of changing an over-the-air (OTA) MLD MAC address for group addressed PPDUs, according to some embodiments of the disclosure.

FIG. 19 illustrates example 1900 of changing an OTA MLD MAC address for group addressed PPDUs, according to some embodiments of the disclosure. For explanation purposes and not a limitation, FIG. 19 may be described with reference to elements from FIG. 15. For example, PE AP MLD 1910 can be PE AP MLD 1510 and PE non-AP MLD 1920 can be PE non-AP MLD 1520 of FIG. 15. System 1900 includes PE AP MLD 1910 that includes 2 affiliated PE APs: PE AP1 1912 and PE AP2 1914 that communicate over corresponding links with PE non-AP MLD 1920. PE non-AP MLD 1920 includes 2 affiliated PE non-AP STAs: PE non-AP STA1 1922 and PE non-AP STA2 1924.

Legacy STA 1930 may not be capable to receive encrypted A-MSDU aggregated group frames. If PE AP MLD 1910 has legacy STA 1930 associated in any affiliated PE AP (e.g., PE AP1 1912), an OTA MLD address may need to be randomized to protect privacy of PE AP MLD 1910. When group addressed frames are transmitted by all affiliated PE APs of a PE AP MLD (e.g., PE AP 1 1912 and PE AP 2 1914), encrypting MLD addresses in one affiliated PE AP (e.g., PE AP 1 1912) of PE AP MLD 1910 may not protect the MLD address transmitted in other affiliated PE APs (e.g., PE AP 2 1914) of PE AP MLD 1910.

In some embodiments, PE non-AP MLD 1920 may change a corresponding OTA MLD address as part of the unicast address set. In some embodiments, PE AP MLD 1910 may change a corresponding OTA MLD address as part of the groupcast address set. For example, the OTA MLD address change may be performed via signaling for configuring and updating link-specific address sets as described in FIG. 8, 9, or 20. At all times, PE AP MLD 1910 should have one corresponding OTA MLD in use and PE non-AP MLD 1920 should have one corresponding OTA MLD in use.

Figure 20:
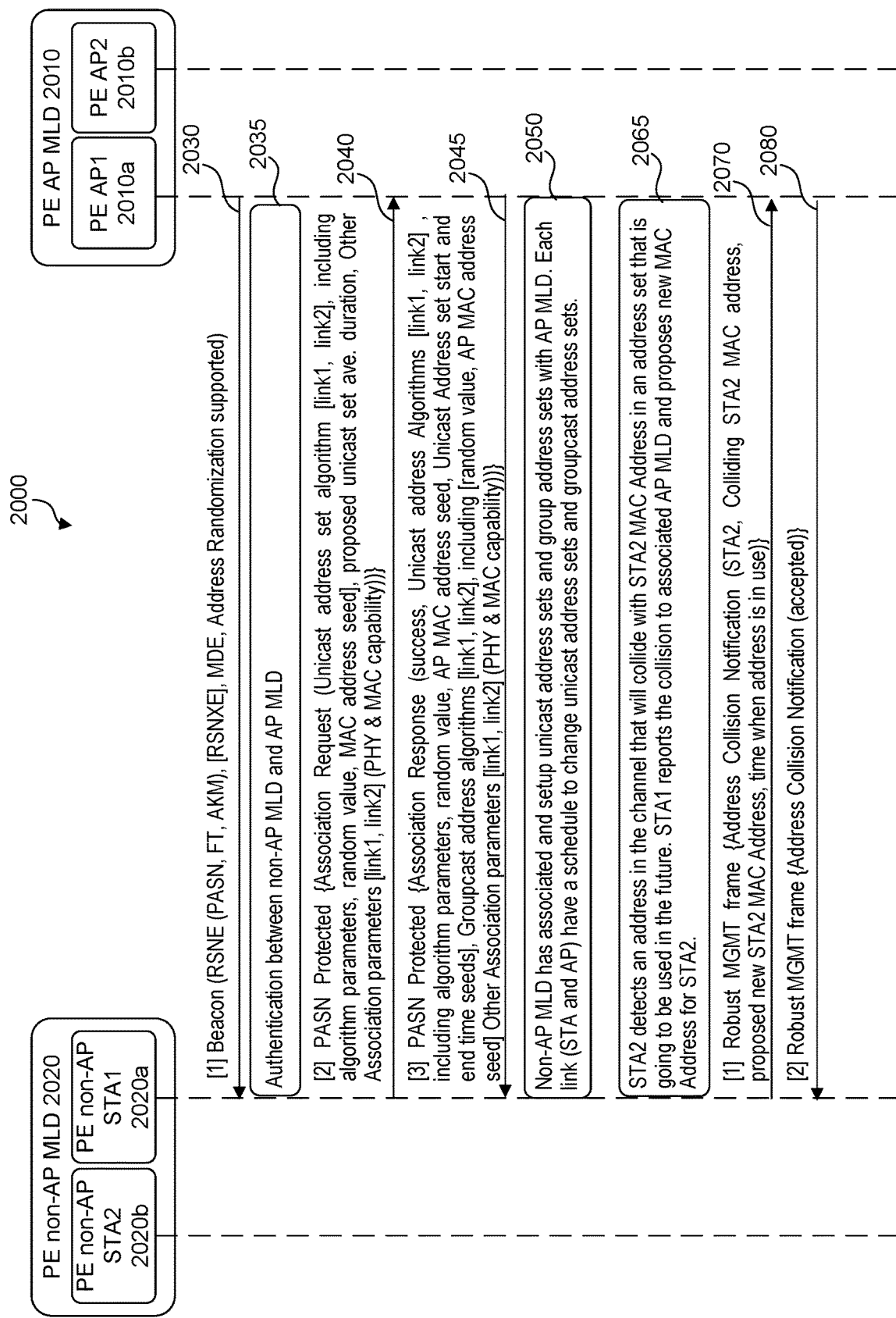
FIG. 20 illustrates an example of signaling for configuring joint algorithms that determine address sets for MLDs and signaling for address collision notification, according to some embodiments of the disclosure.

FIG. 20 illustrates example 2000 of signaling for configuring joint algorithms that determine address sets for MLDs and signaling for address collision notification, according to some embodiments of the disclosure. For explanation purposes and not a limitation, FIG. 20 may be described with reference to elements from FIG. 1. For example, PE AP MLD 2010 can be PE AP MLD 110, affiliated PE AP1 2010*a* and PE AP2 2010*b* can be affiliated PE AP 110*a* and PE AP 110*b*, PE non-AP MLD 2020 can be PE non-AP MLD 120, and affiliated PE non-AP STA1 2020*a* and PE non-AP STA2 2020*b* can be affiliated PE non-AP STA 120*a* and PE non-AP STA 120*b* of FIG. 1.

The Association Request may also contain the PE non-AP MLD SAP MAC Address that is used in frames encryption, and it may include the PE non-AP MLD's MLD address that is used for authentication and association. Similarly, the Association Response may also contain the PE AP MLD SAP MAC Address and PE AP MLD's MLD address that is used in authentication and association.

In some embodiments, individual address sets and group address sets are signaled for all links in the setup signaling. Each link may have independent address change schedules and different random address values. MLD Addresses and MLD level parameters are also setup for PE AP MLD 2010 and PE non-AP MLD 2020. The Address collision notification may be transmitted over any link and it may report collision over any link (e.g., link 1 or link 2 of example 2000).

During association, joint algorithms to configure and update the address set parameters can be arranged. In association signaling, PE AP MLD 2010 and PE non-AP MLD 2020 can agree on set of joint algorithms to calculate link-specific individual address sets and link-specific group address sets. The joint algorithms may also configure address set transition times and the number of address sets in use. Further, the joint algorithms may be different for each link of the multiple links of the MLDs. The communication may occur over one link of multiple links between an affiliated PE AP (e.g., PE AP1 2010*a*) and an affiliated PE non-AP STA (e.g., PE non-AP STA1 2020*a*). PE AP MLD 2010 may change one or all of the joint algorithms or one or more parameter values used for link-specific address sets (e.g., individual address sets or group address sets). For example, if a STA (not shown) has disassociated from PE AP1 2010*a*, a change of the groupcast address set algorithm ensures that only associated STAs (e.g., PE non-AP STA1 2020*a*) can know the next address of PE AP1 2010*a*. Alternatively, PE AP1 2010*a* can maintain the algorithms for group address sets, so that STAs that reassociate with PE AP1 2010*a* may calculate the current PE AP1 2010*a* parameters and discover PE AP1 2010*a*.

At 2030, PE AP1 2010*a* may transmit a Beacon frame that may signal support for address randomization and a minimum number of individual address sets in association. The Beacon frame can include RSNE that includes an indication of: PASN protocol, FT, AKM, RSNXE, MDE, and/or Address Randomization supported.

At 2035, authentication occurs between PE non-AP MLD 2020 and PE AP MLD 2010.

At 2040, PE non-AP STA1 2020*a* transmits a PASN protected Association Request that proposes an individual address set algorithm for link 1 and link 2 (where the algorithms may be different per link) including: algorithm parameters, a random value, and MAC address seed. The Association Request can also include a proposed average duration for individual address sets, and other association parameters for link 1 and for link 2 (e.g., PHY & MAC capabilities of PE non-AP STA1 2020*a*).

At 2045, PE AP1 2010*a* can transmit a PASN protected Association Response that includes an indication of success (or not), an individual address algorithm for link 1 and link 2 and includes: algorithm parameters, a random value, a first AP MAC address seed, and/or individual address set start and end time seeds. The Association Response can also include a group address algorithm for link 1 and for link 2 and include a random value and/or a second AP MAC address seed, where the first AP MAC address seed are different. The Association Response can include other association parameters corresponding to link 1 and link 2 (e.g., PHY & MAC capabilities.)

At 2050, PE non-AP MLD 2020 has associated with PE AP MLD 2010 and has configured individual address sets and/or group address sets for each link as described in Table 1. Individual Address Set and/or Table 4. Group Address Set. Each link (e.g., PE non-AP STA1 2020*a* and PE AP1 2010*a*) has a schedule for changing individual address sets and group address sets.

At 2065, PE non-AP STA2 2020*b* detects an address in the channel that will collide with a MAC address of PE non-AP STA2 2020*b* in an address set that is going to be used in the future. For example, PE non-AP STA2 2020*b* can inform PE non-AP MLD 2020 that causes PE non-AP STA1 2020*a* to report the collision to associated PE AP MLD 2010. The report may include a proposed new MAC address for PE non-AP STA2 2020*b*.

At 2070, PE non-AP STA1 2020*a* can transmit a Robust MGMT frame that includes an Address Collision Notification that can include the following: Colliding PE non-AP STA2 2020*b*'s MAC address, proposed new MAC address for PE non-AP STA2 2020*b*, and a time when the proposed new MAC address for PE non-AP STA2 2020*b* is in use.

At 2080, PE non-AP STA1 2020*a* can transmit a Robust MGMT frame that includes an Address Collision Notification that can include an indication of acceptance (or not).

Figure 21:
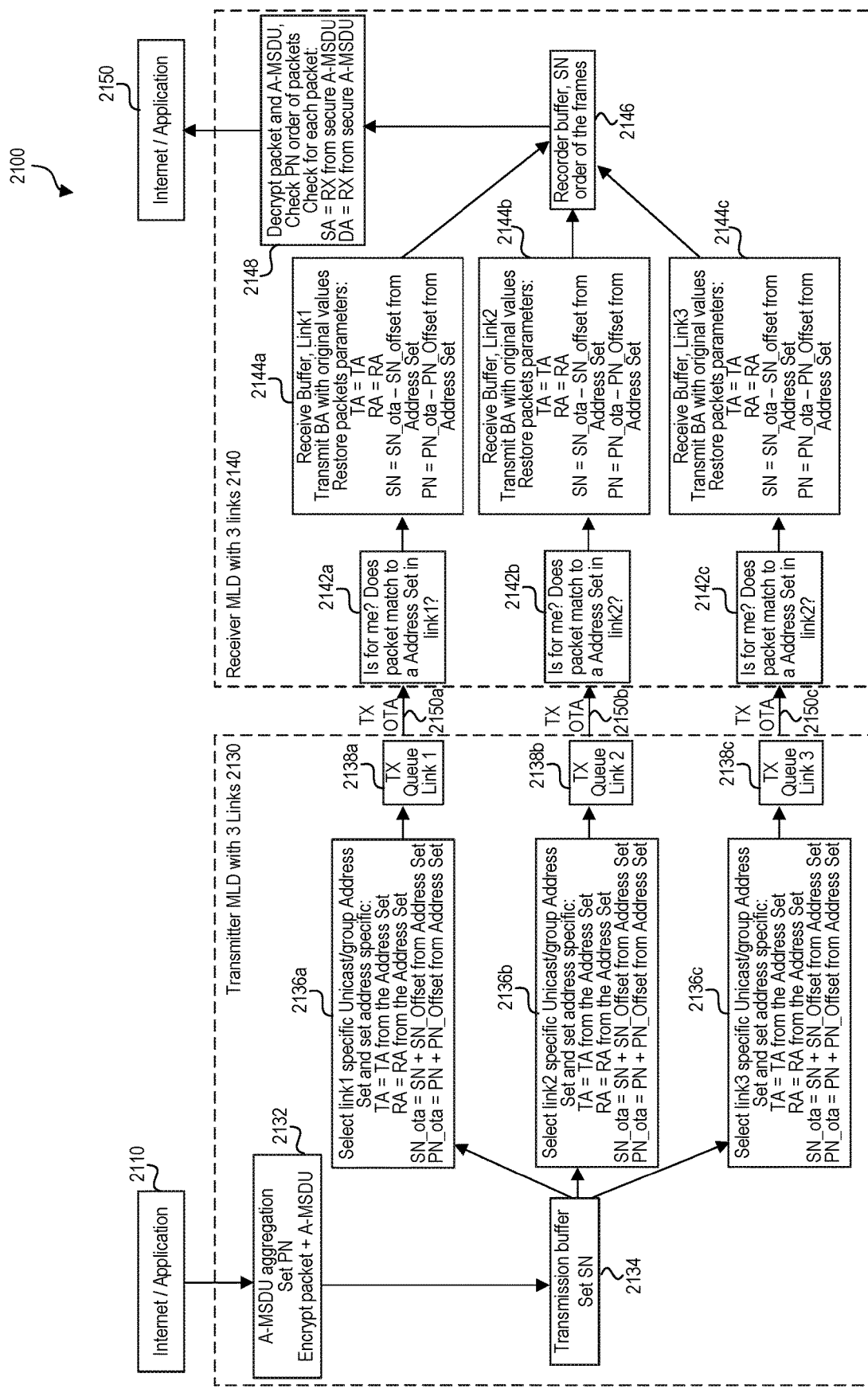
FIG. 21 illustrates an example method for data transmission between PE MLDs, according to some embodiments of the disclosure.

FIG. 21 illustrates example method for data transmission between PE MLDs, according to some embodiments of the disclosure. For explanation purposes and not a limitation, FIG. 21 may be described with reference to elements other figures in the disclosure. In some embodiments, transmitter 2130 can be PE AP 110 that includes 3 affiliated PE APs: PE AP 110a-110c of FIG. 1, and receiver 2140 can be PE non-AP MLD 120 that includes 3 affiliated PE non-AP STAs: PE non-AP STA 120a-120c of FIG. 1. In some embodiments, receiver 2140 can be PE AP 110 that includes 3 affiliated PE APs: PE AP 110a-110c of FIG. 1, and transmitter 2130 can be PE non-AP MLD 120 that includes 3 affiliated PE non-AP STAs: PE non-AP STA 120a-120c of FIG. 1.

In method 2100, for convenience and not a limitation, transmitter 2130 can be PE AP MLD 1510 of FIG. 15, where PE AP MLD 1510 includes 3 affiliated PE APs: PE AP1 1511, PE AP2 1513, and PE AP3 1515. Receiver 2140 can be associated PE non-AP MLD 1520 of FIG. 15, where PE non-AP MLD 1520 includes 3 affiliated PE non-AP STAs: PE non-AP STA1 1521, PE non-AP STA2 1523, PE non-AP STA3 1525. PE AP MLD 1510 can receive data corresponding to an Internet/Application, encrypt the data, and apply an individual address set as described herein, where the individual address set modifies only the addresses and parameters transmitted over-the-air (OTA). PE non-AP MLD 1520 can receive the data, and send block acknowledgement (BA) using the individual address set information. The individual address set application is reversed before the MPDU is decrypted. The MPDU is decrypted and the data sent to the corresponding Internet/Application at 2150. Details of method 2100 are provided below.

At 2110, data corresponding to Internet/Application is generated and send to PE AP MLD 1510 for ultimate transmission to Internet/Application at 2150.

At 2132, PE AP MLD 1510 performs aggregated MAC Service Data Unit (A-MSDU) aggregation to form a MAC Protocol Data Unit (MPDU). PE AP MLD 1510 assigns a packet number (PN) corresponding to the MPDU and encrypts the MPDU.

At 2134, a sequence number (SN) corresponding to the encrypted MPDU is set.

At 2136a, PE AP MLD 1510 selects PE AP1 1511 to transmit the encrypted MPDU, and applies an individual address set as described in Table 1. Individual Address Set such as Set 1 (e.g., 411 of FIG. 4) that corresponds to PE AP1 1511. Accordingly, the Transmitting Address (TA) corresponds to the $BSSID_{unicast}$ of PE AP1 1511 of the individual address set, and the Receiving Address (RA) corresponds to STA Link $Address_{unicast}$ of PE non-AP STA1 1521. In addition, PE AP1 1511 can create an over-the-air (OTA) packet number ($PN_{OTA}$) that is different than the PN corresponding to the MPDU, where the $PN_{OTA}$ is transmitted OTA at 2150a. The $PN_{OTA}=PN+PN_{Offset}$, where the offset PN ($PN_{Offset}$) is the PN $Offset_{unicast}$ of the individual address set. PE AP1 1511 can also create an over-the-air (OTA) sequence number ($SN_{OTA}$) that is different than the SN corresponding to the encrypted MPDU, where the $SN_{OTA}$ is transmitted OTA at 2150a. The $SN_{OTA}=SN+SN_{Offset}$, where the offset SN ($SN_{Offset}$) is the SN Offset $(TID)_{unicast}$ of the individual address set. Similar processes occur on the various links at 2136b and 2136c when PE AP MLD 1510 selects PE AP2 1513 and PE AP3 1515, respectively.

At 2138a, PE AP1 1511 transmits the corresponding data from the transmission queue OTA in a transmission OTA 2150a to receiver 2140 corresponding to PE non-AP STA1. Similar processes occur on the various links at 2138b and 2138c when PE AP MLD 1510 selects PE AP2 1513 and PE AP3 1515, respectively.

At 2142a, PE non-AP STA1 determines whether the transmission is intended for PE non-AP STA1 by determining whether the RA and TA correspond to the individual address set. Similar processes occur on the various links at 2142b and 2142c when PE AP MLD 1510 selects PE AP2 1513 and PE AP3 1515, respectively. For example, the individual address sets would identify PE non-AP STA2 1523 and PE non-AP STA3 1525.

At 2144a, in a receive buffer of PE non-AP STA1, PE non-AP STA1 generates and transmits block acknowledgement (BA) with the received values. Subsequently, PE non-AP STA1 restores the MPDU parameters using the individual address set parameters. For example, PE non-AP STA1 can determine the PN using $PN_{OTA}$ of $PN_{Offset}$ of the individual address profile, and determine the SN using the $SN_{OTA}$ and $SN_{Offset}$ of individual address set, where the PN and the SN correspond to the MPDU. The PN and SN can be determined by the following equations: $PN=PN_{OTA}-PN_{Offset}$ and $SN=SN_{OTA}-SN_{Offset}$. Similar processes occur on the various links at 2144b and 2144c when PE AP MLD 1510 selects PE AP2 1513 and PE AP3 1515, respectively.

At 2146, PE non-AP MLD 1520 can reorder the frames based on the SN.

At 2148, PE non-AP MLD 1520 can decrypt the encrypted MPDU, check the PN order of the MPDUs, and check for each MPDU whether the Source Address (SA) and Destination Address (DA) are received from the secure A-MSDU.

At 2150, the data is sent to the corresponding Internet/Application.

Various embodiments can be implemented, for example, using one or more well-known computer systems, such as computer system 2200 shown in FIG. 22. Computer system 2200 can be any well-known computer capable of performing the functions described herein. For example, and without limitation, PE AP MLD 110, PE AP 110a-110c, PE non-AP MLD 120, PE non-AP STA 120a-120c, STA 130, STA 170, STA 180, and AP 160 of FIG. 1, system 200 of FIG. 2, system 400 and example 450 of FIGS. 4A and 4B, system 500 and example 550 of FIGS. 5A and 5B, examples 600, 700, 800, 900, 1000, 1100, 1200, 1350, 1500, 1600, 1700, 1800, 1810a, 1900, 2000, and 2100 of FIGS. 6-12, 13B, 15-17, 18A, 18B, and 19-21 (and/or other apparatuses and/or components shown in the figures) may be implemented using computer system 2300, or portions thereof.

Computer system 2300 includes one or more processors (also called central processing units, or CPUs), such as a processor 2304. Processor 2304 is connected to a communication infrastructure 2306 that can be a bus. One or more processors 2304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 2300 also includes user input/output device(s) 2303, such as monitors, keyboards, pointing devices, etc., that communicate with communication infrastructure 2306 through user input/output interface(s) 2302. Computer system 2300 also includes a main or primary memory 2308, such as random access memory (RAM). Main memory 2308 may include one or more levels of cache. Main memory 2308 has stored therein control logic (e.g., computer software) and/or data.

Computer system 2300 may also include one or more secondary storage devices or memory 2310. Secondary memory 2310 may include, for example, a hard disk drive 2312 and/or a removable storage device or drive 2314.

Removable storage drive 2314 may be a floppy disk drive, a magnetic tape drive, a compact disk drive, an optical storage device, tape backup device, and/or any other storage device/drive.

Removable storage drive 2314 may interact with a removable storage unit 2318. Removable storage unit 2318 includes a computer usable or readable storage device having stored thereon computer software (control logic) and/or data. Removable storage unit 2318 may be a floppy disk, magnetic tape, compact disk, DVD, optical storage disk, and/any other computer data storage device. Removable storage drive 2314 reads from and/or writes to removable storage unit 2318 in a well-known manner.

According to some embodiments, secondary memory 2310 may include other means, instrumentalities or other approaches for allowing computer programs and/or other instructions and/or data to be accessed by computer system 2300. Such means, instrumentalities or other approaches may include, for example, a removable storage unit 2322 and an interface 2320. Examples of the removable storage unit 2322 and the interface 2320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 2300 may further include a communication or network interface 2324. Communication interface 2324 enables computer system 2300 to communicate and interact with any combination of remote devices, remote networks, remote entities, etc. (individually and collectively referenced by reference number 2328). For example, communication interface 2324 may allow computer system 2300 to communicate with remote devices 2328 over communications path 2326, which may be wired and/or wireless, and which may include any combination of LANs, WANs, the Internet, etc. Control logic and/or data may be transmitted to and from computer system 2300 via communication path 2326.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 2300, main memory 2308, secondary memory 2310 and removable storage units 2318 and 2322, as well as tangible articles of manufacture embodying any combination of the foregoing. Such control logic, when executed by one or more data processing devices (such as computer system 2300), causes such data processing devices to operate as described herein.

Figure 23:
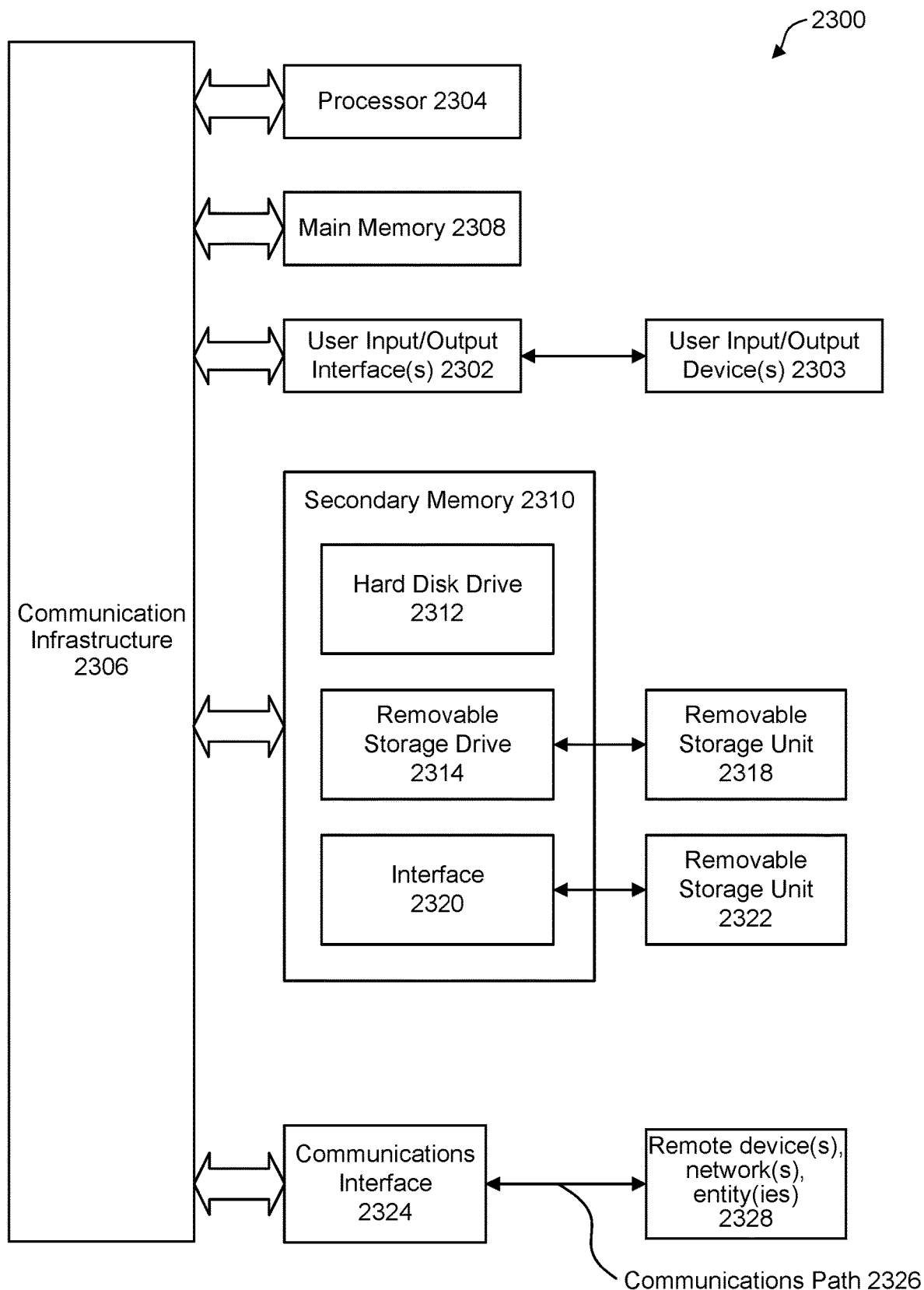
FIG. 23 is an example computer system for implementing some embodiments or portion(s) thereof.

Based on the teachings contained in this disclosure, it will be apparent to persons skilled in the relevant art(s) how to make and use embodiments of the disclosure using data processing devices, computer systems and/or computer architectures other than that shown in FIG. 23. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A privacy enhanced (PE) access point (AP) multi-link device (MLD), comprising:
one or more affiliated APs operating on different links; and
a processor coupled to the one or more affiliated APs, configured to:
generate a first over the air (OTA) MLD address based at least on an MLD address of the PE AP MLD, for a first affiliated PE AP (PE AP1) of the one or more affiliated APs, wherein the first OTA MLD address is different than a second OTA MLD address for a second affiliated PE AP (PE AP2) of the one or more affiliated APs;
encrypt an aggregated Media Access Control (MAC) service data unit (A-MSDU) for transmission to a first PE non-AP station (PE non-AP STA1) of a PE non-AP MLD, the A-MSDU comprising a packet number (PN);
after the encryption, create an OTA packet number ($PN_{OTA}$) that is different than the PN corresponding to the A-MSDU, wherein a first data transmission comprises the $PN_{OTA}$; and
transmit the first data transmission using the first OTA MLD address, wherein the first data transmission comprises a subframe of the A-MSDU that includes the MLD address.

2. The PE AP MLD of claim 1, wherein the processor is further configured to:
generate a first parameter based at least on an MLD-level parameter of the PE AP MLD, for the PE AP1, wherein the first parameter is different than a second parameter of the PE AP2, wherein the second parameter is based at least on the MLD-level parameter of the PE AP MLD.

3. The PE AP MLD of claim 2, wherein the processor is further configured to:
establish two or more link-1 specific address profiles corresponding to the PE AP1 and the PE non-AP STA1, wherein the two or more link-1 specific address profiles are different than other link-specific address profiles corresponding to the PE AP2;
establish a schedule for switching from a first link-1 specific address profile to a second link-1 specific address profile, wherein the first and the second link-1 specific address profiles are of the two or more link-1 specific address profiles; and
transmit a second data transmission using the first parameter, wherein the first parameter corresponds to the first link-1 specific address profile.

4. The PE AP MLD of claim 3, wherein the schedule for switching from the first link-1 specific address profile to the second link-1 specific address profile is based on the first parameter, wherein the MLD-level parameter of the PE AP MLD comprises an MLD-level time synchronization function (TSF) parameter.

5. The PE AP MLD of claim 3, wherein the processor is further configured to:
switch from the first link-1 specific address profile to the second link-1 specific address profile based on the schedule; and
transmit a third data transmission using the second link-1 specific address profile.

6. The PE AP MLD of claim 1,
wherein a first link-1 specific address profile corresponding to the PE AP1 and the PE non-AP STA1 comprises an offset PN ($PN_{Offset}$) based at least on an MLD-level PN parameter, and wherein the $PN_{OTA}=PN+PN_{Offset}$.

7. The PE AP MLD of claim 1, wherein the processor is further configured to:
after the encryption, create an OTA sequence number ($SN_{OTA}$) that is different than a sequence number (SN) corresponding to the A-MSDU, wherein a second data transmission comprises the $SN_{OTA}$, wherein a first link-1 specific address profile comprises an offset SN ($SN_{Offset}$) based at least on an MLD-level SN parameter, and wherein the $SN_{OTA}=SN+SN_{Offset}$.

8. The PE AP MLD of claim 3, wherein the processor is further configured to:
after the encryption, apply a first PE AP1 identifier of the first link-1 specific address profile, wherein the second data transmission comprises the first PE AP1 identifier.

9. The PE AP MLD of claim 3, wherein to establish the two or more link-1 specific address profiles, the processor is configured to:
establish a joint algorithm with the PE non-AP STA1; and
use the joint algorithm to determine the first and the second link-1 specific address profiles as well as transition times for the schedule.

10. The PE AP MLD of claim 9, wherein to establish the joint algorithm, the processor is further configured to:
receive a link-1 specific individual address set algorithm, a MAC address seed, and a proposed address set average duration; and
transmit in response to the reception, a link-1 specific individual address set start time seed, a link-1 specific individual address set end time seed, a link-1 specific group address algorithm, and a PE AP1 MAC address seed.

11. The PE AP MLD of claim 3, wherein the processor is further configured to:
receive from the PE non-AP STA1, a notification of a colliding MAC address, wherein the notification comprises: the colliding MAC address, a proposed new MAC address for the PE non-AP STA1, a time when the proposed new MAC address for the PE non-AP STA1 is in use, or a proposed new MAC address for the PE AP1; and
transmit to the PE non-AP STA1, a confirmation message corresponding to the notification.

12. The PE AP MLD of claim 3, wherein the first link-1 specific address profile comprises one or more randomized parameters comprising: an association ID (AID) or a color value.

13. The PE AP MLD of claim 1, wherein the processor is further configured to:
correlate the MLD address of the PE AP MLD with multiple addresses comprising: the first OTA MLD address, a unique MLD address, and a MAC service access point (SAP) MLD address.

14. The PE AP MLD of claim 1, wherein the first OTA MLD address is the same as a MAC service access point (SAP) MLD address of the PE AP MLD.

15. A privacy enhanced (PE) non-access point (AP) multi-link device (MLD), comprising:
   one or more affiliated stations (STAs) operating on different links; and
   a processor coupled to the one or more affiliated STAs, configured to:
   generate a first over the air (OTA) MLD address based at least on an MLD address of the PE non-AP MLD, for a first affiliated PE non-AP STA (PE non-AP STA1) of the one or more affiliated STAs, wherein the first OTA MLD address is different than a second OTA MLD address for a second affiliated PE non-AP (PE non-AP STA2) of the one or more affiliated STAs;
   encrypt an aggregated Media Access Control (MAC) service data unit (A-MSDU) for transmission to a first PE AP (PE AP1) of a PE AP MLD, the A-MSDU comprising a packet number (PN);
   after the encryption, create an OTA packet number ($PN_{OTA}$) that is different than the PN corresponding to the A-MSDU, wherein a first data transmission comprises the $PN_{OTA}$; and
   transmit the first data transmission using the first OTA MLD address, wherein the first data transmission comprises a subframe of the A-MSDU that includes the MLD address.

16. The PE non-AP MLD of claim 15, wherein the processor is further configured to:
   generate a first parameter based at least on an MLD-level parameter of the PE non-AP MLD, for the PE non-AP STA1, wherein the first parameter is different than a second parameter of the PE non-AP STA2, wherein the second parameter is based at least on the MLD-level parameter of the PE non-AP MLD.

17. The PE non-AP MLD of claim 16, wherein the processor is further configured to:
   establish two or more link-1 specific address profiles corresponding to the PE non-AP STA1 and the PE AP1, wherein the two or more link-1 specific address profiles are different than other link-specific address profiles corresponding to the PE non-AP STA2;
   establish a schedule for switching from a first link-1 specific address profile to a second link-1 specific address profile, wherein the first and the second link-1 specific address profiles are of the two or more link-1 specific address profiles; and
   transmit a second data transmission using the first parameter, wherein the first parameter corresponds to the first link-1 specific address profile.

18. The PE non-AP MLD of claim 17, wherein the schedule for switching from the first link-1 specific address profile to the second link-1 specific address profile is based on a link-1 specific time synchronization function (TSF) parameter.

19. The PE non-AP MLD of claim 17, wherein the processor is further configured to:
   switch from the first link-1 specific address profile to the second link-1 specific address profile based on the schedule; and
   transmit a third data transmission using the second link-1 specific address profile.

20. The PE non-AP MLD of claim 17, wherein a first link-1 specific address profile corresponding to the PE non-AP STA1 and the PE AP1 comprises an offset PN ($PN_{Offset}$) based at least on an MLD-level PN parameter, and wherein the $PN_{OTA} = PN + PN_{Offset}$.

* * * * *